(12) United States Patent
Taniguchi

(10) Patent No.: US 6,222,841 B1
(45) Date of Patent: Apr. 24, 2001

(54) DATA TRANSMISSION SYSTEM AND METHOD

(75) Inventor: Koji Taniguchi, Kawasaki (JP)

(73) Assignee: Digital Vision Laboratories Corporation, Tokyo (JP)

( * ) Notice: Subject to any disclaimer, the term of this patent is extended or adjusted under 35 U.S.C. 154(b) by 0 days.

(21) Appl. No.: 08/856,493

(22) Filed: May 14, 1997

(30) Foreign Application Priority Data

Jan. 8, 1997 (JP) .................................... 9-001367

(51) Int. Cl.[7] .................................................. H04L 12/28
(52) U.S. Cl. ............................................ 370/389; 370/230
(58) Field of Search .................................... 370/230, 232, 370/233, 234, 235, 253, 395, 397, 389

(56) References Cited

U.S. PATENT DOCUMENTS

| | | |
|---|---|---|
| 5,168,356 | 12/1992 | Acampora et al. . |
| 5,208,805 | * 5/1993 | Ochiai .................................... 370/60 |
| 5,241,535 | 8/1993 | Yoshikawa . |
| 5,253,058 | 10/1993 | Gharavi . |
| 5,270,813 | 12/1993 | Puri et al. . |
| 5,414,455 | 5/1995 | Hooper et al. . |
| 5,434,848 | 7/1995 | Chimento, Jr. et al. . |
| 5,467,132 | 11/1995 | Fazel et al. . |
| 5,481,297 | 1/1996 | Cash et al. . |
| 5,633,861 | * 5/1997 | Hanson et al. ........................ 370/232 |

FOREIGN PATENT DOCUMENTS 8-191451   7/1996 (JP) .

OTHER PUBLICATIONS

"Transmission of Non–Telephone Signals", *International Telecommunication Union Recommendation H.222.0*, 1–132, Jul. 1995.

Mehaoua, Ahmed et al., "A Picture Quality Control Framework for MPEG video over ATM", *Protocols for High–Speed Networks V*, 49–59, Oct. 1996.

* cited by examiner

*Primary Examiner*—Chi H. Pham
*Assistant Examiner*—Kim T. Nguyen
(74) *Attorney, Agent, or Firm*—Christensen O'Connor Johnson Kindness PLLC

(57) ABSTRACT

A data transmission system for transmitting an encoded stream via a network, has a video transmission unit having a stream coding unit for generating an encoded stream which is packetized in units of abandonable data, and in which a header including a packet identifier also serving as packet priority is added to each packet, and a stream shaping processing unit for determining transmission or abandonment of each packet in the encoded stream generated by the stream coding unit using the packet identifier included in the header of each packet in accordance with the designated bit rate.

13 Claims, 28 Drawing Sheets

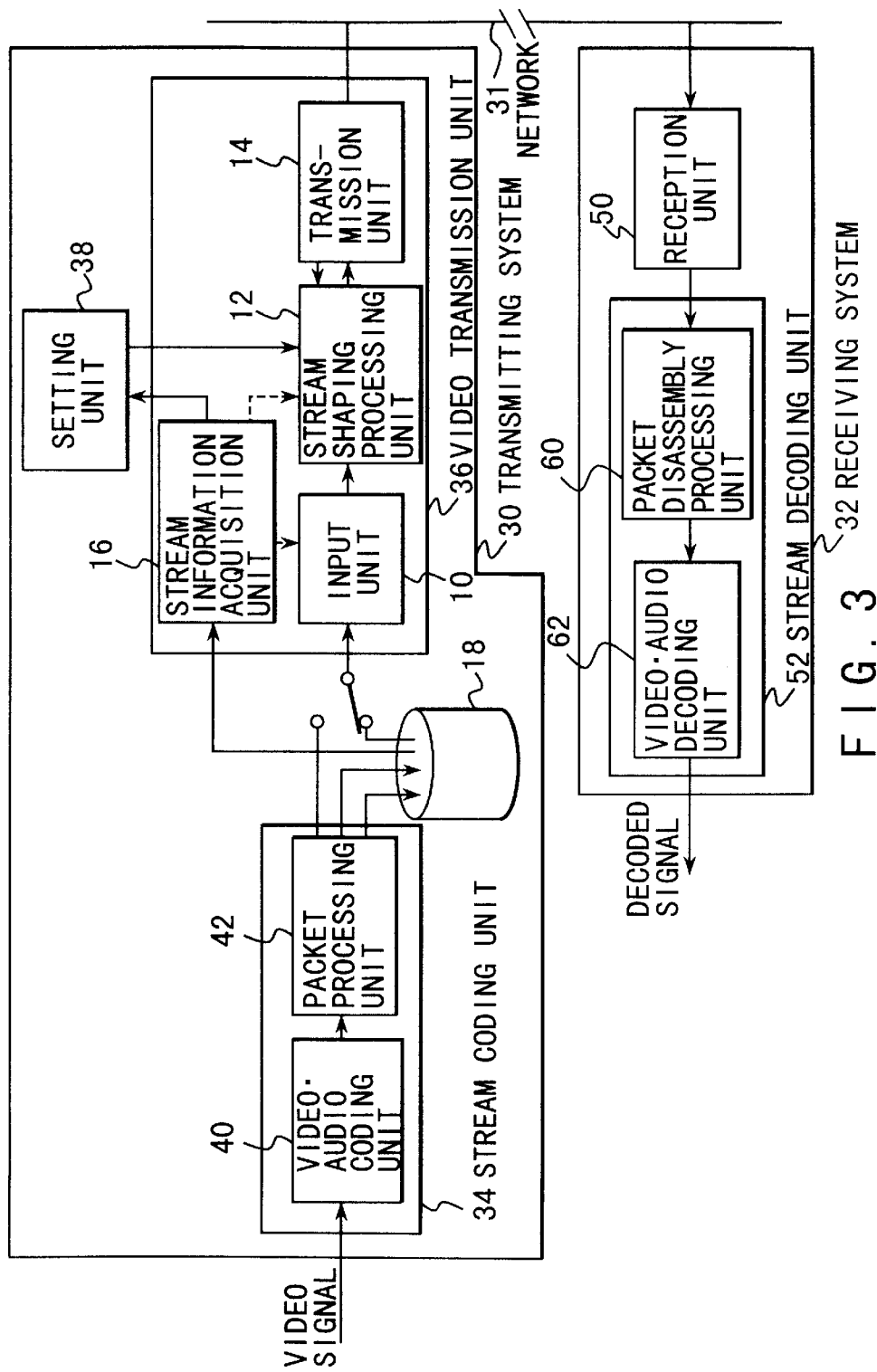
F I G. 3

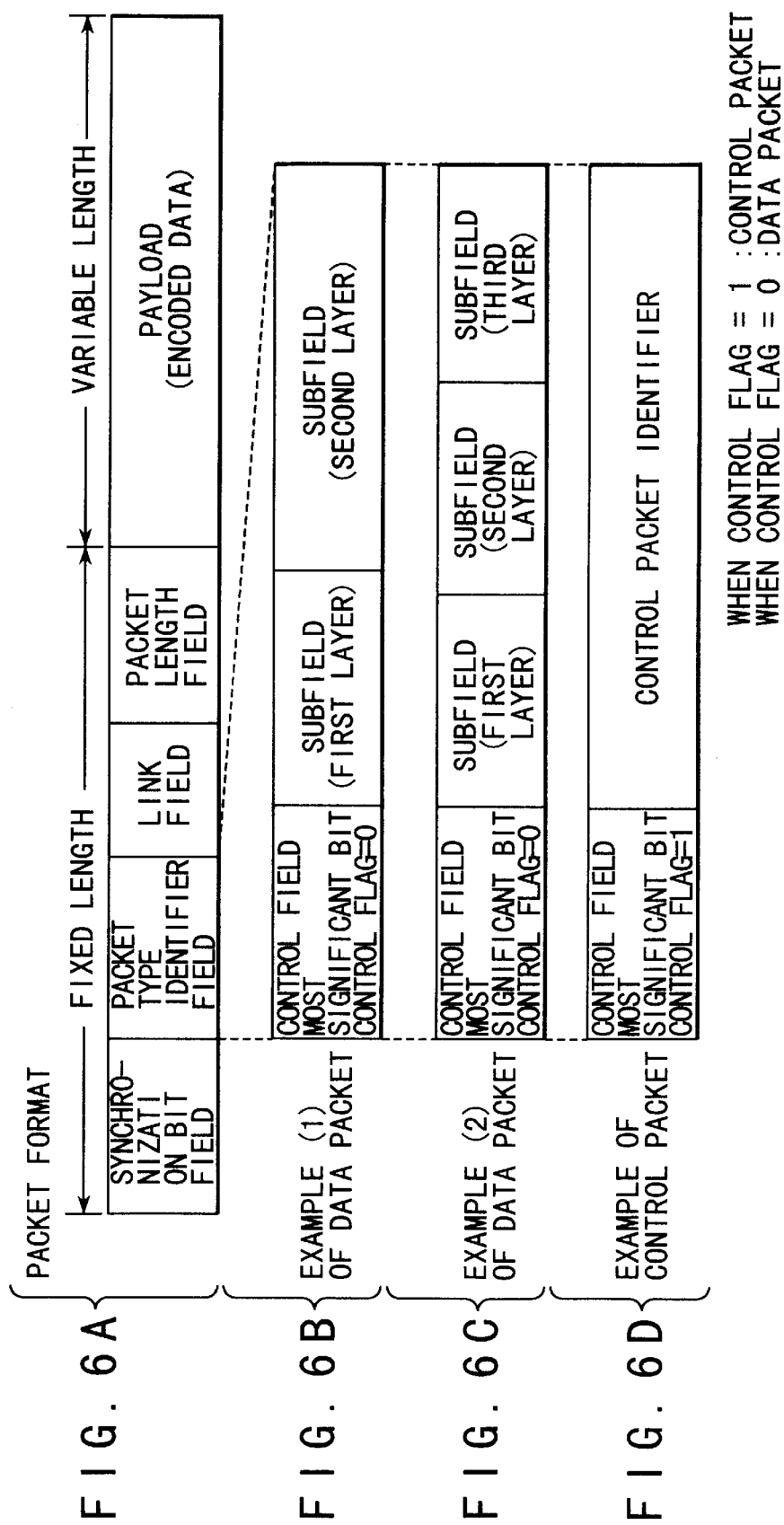

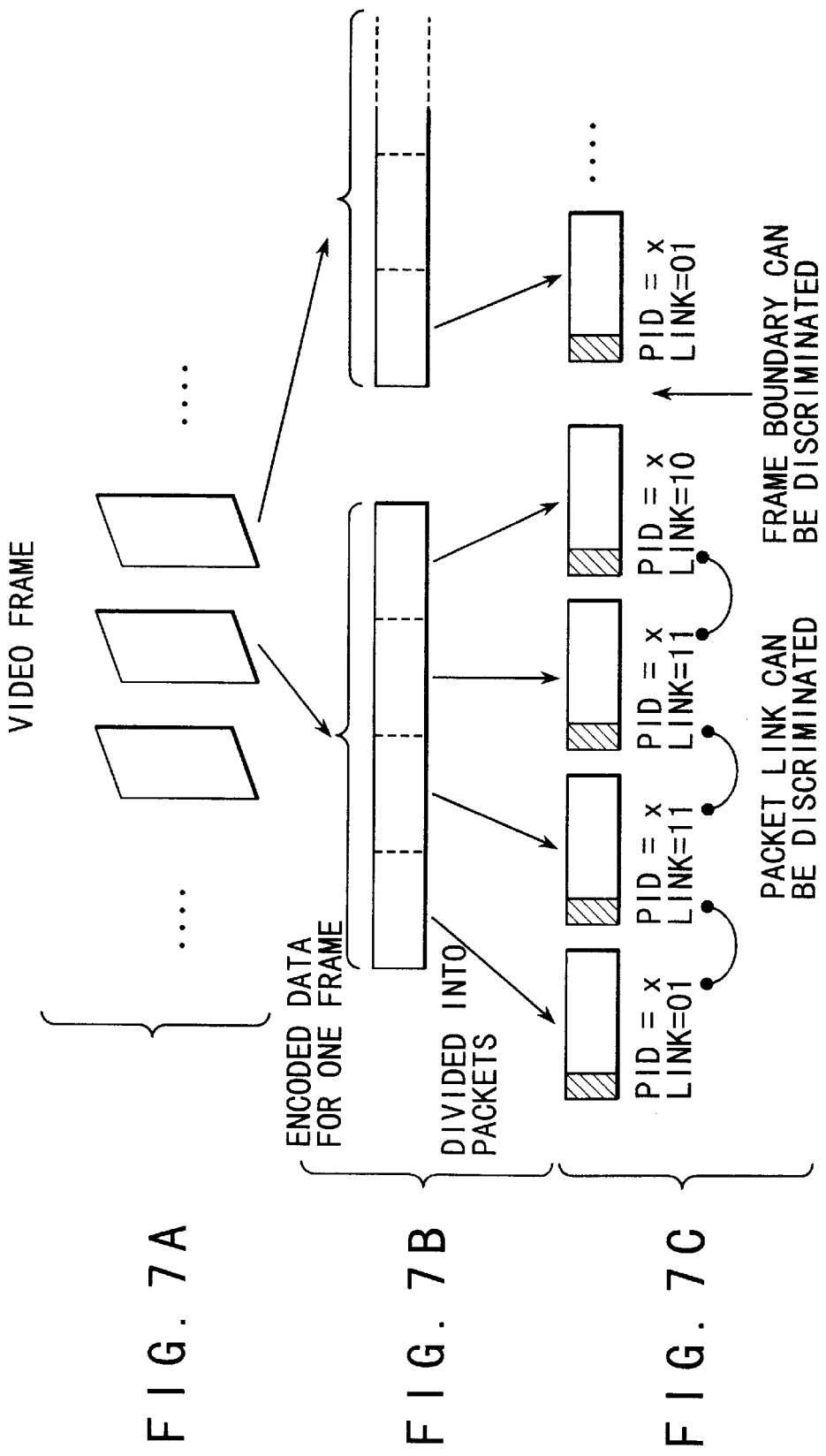

LAYERS OF PACKET TYPE IDENTIFIER

| FIRST LAYER | SECOND LAYER | THIRD LAYER |
|---|---|---|
| PROGRAM 1 | VIDEO | SYSTEM |
| | | I PICTURE |
| | | P PICTURE |
| | | B PICTURE |
| | AUDIO | – |
| | USER DATA | – |
| PROGRAM 2 | VIDEO | SYSTEM |
| | | I PICTURE |
| | | P PICTURE |
| | | B PICTURE |
| | AUDIO | – |
| | USER DATA | – |

FIG. 8

PARTIALLY ABANDONABLE FLAG AND ABSOLUTE PRIORITY FLAG

| IDENTIFIER | IDENTIFIER SUBFIELD | | REMARKS |
|---|---|---|---|
| | SECOND LOWER BIT PARTIALLY ABANDONABLE FLAG | LEAST SIGNIFICANT BIT ABSOLUTE PRIORITY FLAG | |
| XXXX | 1 | 1 | PARTIALLY ABANDONABLE · ABSOLUTE PRIORITY |
| XXXX | 1 | 0 | PARTIALLY ABANDONABLE · VARIABLE PRIORITY |
| XXXX | 0 | 1 | PARTIALLY UNABANDONABLE · ABSOLUTE PRIORITY |
| XXXX | 0 | 0 | PARTIALLY UNABANDONABLE · VARIABLE PRIORITY |

FIG. 9

EXAMPLE OF ASSIGNMENT OF PACKET TYPE IDENTIFIER

| CONTROL FLAG | FIRST LAYER (4 BITS) | | SECOND LAYER (4 BITS) | |
|---|---|---|---|---|
| | DATA TYPE | IDENTIFIER (BINARY) | FRAME TYPE | IDENTIFIER (BINARY) |
| 0 | AUDIO | 01 0 0 | NOT USED | (0000) |
| 0 | VIDEO | 10 0 1 1 1 | SYSTEM | 00 0 1 1 1 |
| | | | I PICTURE | 01 |
| | | | P PICTURE | 10 |
| | | | B PICTURE | 11 |
| 0 | USER DATA | 11 0 0 | NOT USED | (0000) |

FIG. 10A

EXAMPLE OF ASSIGNMENT OF PACKET TYPE IDENTIFIER

| CONTROL FLAG | FIRST LAYER (4 BITS) | | SECOND LAYER (4 BITS) | |
|---|---|---|---|---|
| | DATA TYPE | IDENTIFIER (BINARY) | FRAME TYPE | IDENTIFIER (BINARY) |
| 0 | AUDIO | 01 0 0 | NOT USED | (0000) |
| 0 | VIDEO | 10 0 1 0 0 | ODD FRAME | 00 0 0 |
| | | | EVEN FRAME | 01 |
| 0 | USER DATA | 11 0 0 | NOT USED | (0000) |

FIG. 10B

PACKET IDENTIFIER (EXAMPLE 1)

| IDENTIFIER | CONTROL FLAG | FIRST LAYER (4 BITS) | | SECOND LAYER (4 BITS) | |
|---|---|---|---|---|---|
| | | DATA | IDENTIFIER | FRAME | IDENTIFIER |
| 000000000 | 0 | | | — | 0000 |
| 001100001 | | AUDIO | 0000 | SYSTEM | 0001 |
| 001100111 | | VIDEO | 0110 | I PICTURE | 0111 |
| 001101011 | | | | P PICTURE | 1011 |
| 001101111 | | | | B PICTURE | 1111 |

FIG. 11A

SETTING EXAMPLE OF CORRESPONDENCE TABLE BETWEEN IDENTIFIER AND PRIORITY (EXAMPLE 1)

| IDENTIFIER | EXAMPLE OF PRIORITY SETTING (HEXADECIMAL NOTATION) | | | |
|---|---|---|---|---|
| | A | B | C | D |
| 000000000 | FF | 00 | 00 | 00 |
| 001100001 | 00 | 00 | 00 | 01 |
| 001100101 | 00 | 00 | 00 | 02 |
| 001101001 | 00 | 00 | 01 | 03 |
| 001101101 | FF | FF | FF | 04 |

00: INDICATES "ALWAYS TRANSMIT"
00 TO FE: INDICATES HIGHER PRIORITY AS NUMBER IS SMALLER
FF: INDICATES "ALWAYS ABANDON"

FIG. 11B

EXPLANATION OF PACKET PROCESSING (EXAMPLE 1)

| EXAMPLE | PACKET PROCESSING | PACKET TYPE |
|---|---|---|
| A | TRANSMIT | SYSTEM AND I, P PICTURES |
|   | ABANDON | B PICTURE AND AUDIO |
| B | TRANSMIT | SYSTEM AND I PICTURE, AUDIO |
|   | ABANDON | P, B PICTURES |
| C | TRANSMIT | SYSTEM AND AUDIO |
|   | TRANSMIT/ABANDON | P PICTURE |
|   | ABANDON | B PICTURE |
| D | TRANSMIT | SYSTEM AND AUDIO |
|   | TRANSMIT/ABANDON | I, P, B PICTURES |

A TO C: EXAMPLE OF PRIORITY ADJUSTED BY USER
D: DEFAULT PRIORITY

FIG. 11C

PACKET IDENTIFIER (EXAMPLE 2)

| IDENTIFIER (13 BITS) | CONTROL FLAG | FIRST LAYER (4 BITS) | | SECOND LAYER (4 BITS) | | THIRD LAYER (4 BITS) | |
|---|---|---|---|---|---|---|---|
| | | TRANSMIT | IDENTIFIER | DATA | IDENTIFIER | FRAME | IDENTIFIER |
| 0011001000000000 | 0 | TRANSMIT 1 | 0110 | AUDIO | 0000 | – | 0000 |
| 0011001001100001 | | | | VIDEO | 0110 | SYSTEM | 0001 |
| 0011001001100111 | | | | | | I PICTURE | 0111 |
| 0011001001101011 | | | | | | P PICTURE | 1011 |
| 0011001001101111 | | | | | | B PICTURE | 1111 |
| 0101001000000000 | | TRANSMIT 2 | 1010 | AUDIO | 0000 | – | 0000 |
| 0101001001100001 | | | | VIDEO | 0110 | SYSTEM | 0001 |
| 0101001001100111 | | | | | | I PICTURE | 0111 |
| 0101001001101011 | | | | | | P PICTURE | 1011 |
| 0101001001101111 | | | | | | B PICTURE | 1111 |

FIG. 12A

SETTING EXAMPLE OF CORRESPONDENCE TABLE BETWEEN IDENTIFIER AND PRIORITY (EXAMPLE 2)
| IDENTIFIER (BINARY: 13BITS) | EXAMPLE OF PRIORITY SETTING (HEXADECIMAL NOTATION) | | | |
|---|---|---|---|---|
| | A | B | C | D |
| 0011000000000 | FF | 00 | 00 | 00 |
| 0011001100001 | FF | 00 | 00 | 01 |
| 0011001100111 | FF | 00 | 00 | 02 |
| 0011001101011 | FF | 00 | 01 | 03 |
| 0011001101111 | FF | 00 | 02 | 04 |
| 0101000000000 | 00 | FF | 00 | 05 |
| 0101001100001 | 00 | 00 | 00 | 06 |
| 0101001100111 | 00 | FF | 00 | 07 |
| 0101001101011 | 00 | FF | FF | 08 |
| 0101001101111 | 00 | FF | FF | 09 |
F I G. 1 2 B

EXPLANATION OF PACKET PROCESSING (EXAMPLE 2)

| EXAMPLE | PACKET PROCESSING | PACKET TYPE |
|---|---|---|
| A | TRANSMIT | PROGRAM 2 |
|   | ABANDON | PROGRAM 1 |
| B | TRANSMIT | SYSTEM, I PICTURE OF PROGRAMS 1,2 |
|   | ABANDON | P, B PICTURE, AUDIO OF PROGRAM 2 |
| C | TRANSMIT | SYSTEM, I PICTURE, AUDIO OF PROGRAMS 1,2 |
|   | TRANSMIT/ABANDON | P, B PICTURES OF PROGRAM 1 |
|   | ABANDON | P, B PECTURES OF PROGRAM 2 |
| D | TRANSMIT | AUDIO OF PROGRAM 1 |
|   | TRANSMIT/ABANDON | OTHER PACKETS |

A TO C: EXAMPLE OF PRIORITY ADJUSTED BY USER
D: DEFAULT PRIORITY

F I G. 1 2 C

IDENTIFIER-PRIORITY CORRESPONDENCE TABLE WITH
PARTIALLY ABANDONABLE/UNABANDONABLE FLAG

| IDENTIFIER | PRIORITY | PARTIALLY ABANDONABLE |
|---|---|---|
| 001100000000 | 00 | 0 |
| 001100110001 | 01 | 1 |
| 001100110111 | 02 | 1 |
| 001100111011 | 03 | 1 |
| 001100111111 | 04 | 1 |
| 010100000000 | 05 | 0 |
| 010100110001 | 06 | 1 |
| 010100110111 | 07 | 1 |
| 010100111011 | 08 | 1 |
| 010100111111 | 09 | 1 |

FIG. 13

EXAMPLE OF FILTERING INFORMATION TABLE

| IDENTIFIER (BINARY) | PRIORITY (HEXADECIMAL: 8 BITS) |
|---|---|
| 000000000 | 00 |
| 001100001 | 00 |
| 001100101 | 01 |
| 001101001 | 02 |
| 001101101 | 03 |
| 100000000 | CYCLE INFORMING |
| 100000001 | STREAM END |
| Bpc | XXXXXX |

FIG. 14

DISCRIMINATION OF FRAME BOUNDARY

| IDENTI-FIER | LINK FIELD | SYSTEM | I PICTURE | P PICTURE | B PICTURE | AUDIO |
|---|---|---|---|---|---|---|
| 001100001 | 01 | HEAD | | | | |
| 001100001 | 11 | | | | | |
| 000000000 | XX | | | | | |
| 000000000 | XX | | | | | |
| 001100001 | 11 | | | | | |
| 001100001 | 10 | | | | | |
| 001100101 | 01 | | HEAD | | | |
| 001100101 | 11 | | | | | |
| 001100101 | 11 | | | | | |
| 001100101 | 10 | | | | | |
| 001101001 | 01 | | | HEAD | | |
| 001101001 | 11 | | | | | |
| 000000000 | XX | | | | | |
| 000000000 | XX | | | | | |
| 000000000 | XX | | | | | |
| 001101001 | 10 | | | | | |
| 001101101 | 01 | | | | HEAD | |
| 001101101 | 10 | | | | | |
| 001101101 | 01 | | | | HEAD | |
| 001101101 | 10 | | | | | |

FIG. 15

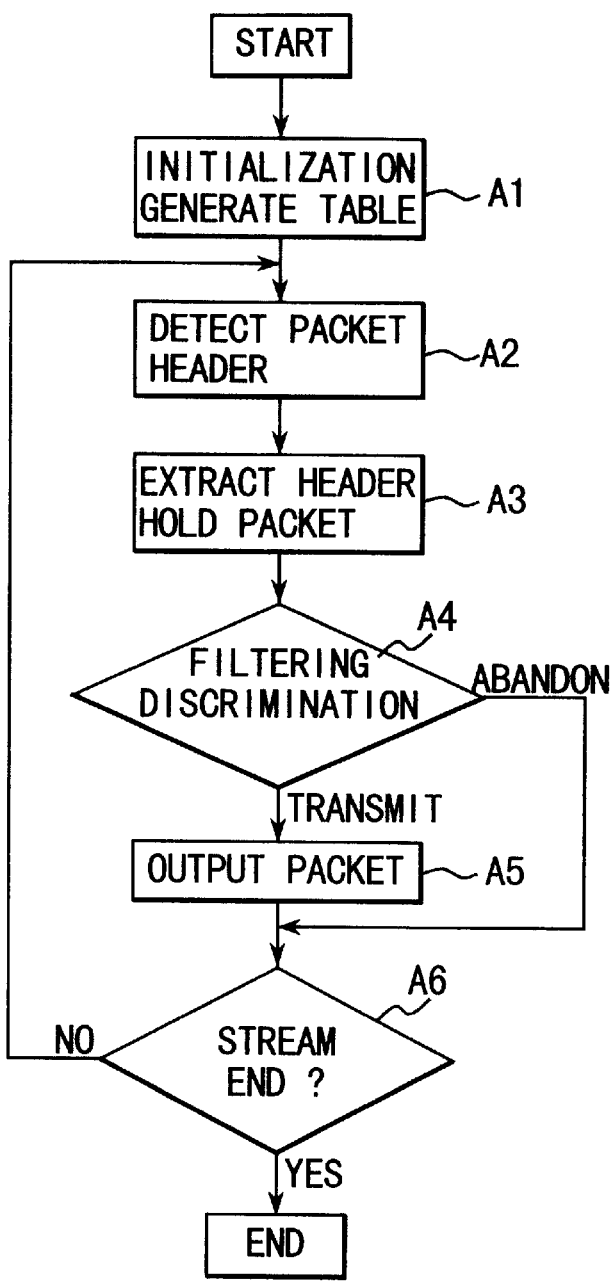
STREAM SHAPING PROCESSING
F I G. 16

CHANGES OVER TIME IN PACKET TRANSMISSION STATE

| | I | P | B | B | P | B | B | P | B | B | P | B | B | REMARKS |
|---|---|---|---|---|---|---|---|---|---|---|---|---|---|---|
| 1ST CYCLE | O | | | | | | | | | | | | | TRANSMIT ONLY I PICTURE |
| 2ND CYCLE | O | O | | | | | | | | | | | | ADDITIONALLY TRANSMIT P PICTURE |
| 3RD CYCLE | O | O | | | O | | | | | | | | | |
| 4TH CYCLE | O | O | | | O | | | O | | | | | | |
| 5TH CYCLE | O | O | | | O | | | O | | | O | | | TRANSMIT ALL I, P PICTURES |
| 6TH CYCLE | O | O | O | | O | | | O | | | O | | | ADDITIONALLY TRANSMIT B PICTURE |
| 7TH CYCLE | O | O | O | | O | | | O | | | O | | | |
| 8TH CYCLE | O | O | O | O | O | | | O | | | O | | | |
| 9TH CYCLE | O | O | O | O | O | O | | O | | | O | | | |
| 10TH CYCLE | O | O | O | O | O | O | O | O | | | O | | | |
| 11TH CYCLE | O | O | O | O | O | O | O | O | O | ⊠ | ⊠ | | | DESIGNATED RATE HAS BEEN EXCEEDED |
| 12TH CYCLE | O | O | O | O | O | O | O | O | | | O | | | CONSTANT FROM THIS CYCLE |
| ... | | | | | | | | | | | | | | |
| n-TH CYCLE | O | O | O | O | O | O | O | O | | | O | | | |

F I G. 1 8

FILTERING PROCESSING WITH BIT RATE CONTROL

TRANSMISSION RESULT CONFIRMATION PROCESSING

| PACKET ABANDONMENT RESULT OF PREVIOUS CYCLE | | PROCESSING CONTENTS | | | |
|---|---|---|---|---|---|
| FRAME OVER FLAG | BYTE OVER FLAG | DISCRIMINATION BOUNDARY LEVEL | NUMBER OF TRANSMISSION-PERMITTED FRAMES | FIX FLAG | |
| OFF | OFF | +1 | =1 | | TRANSMIT ALL PACKETS HAVING SAME PRIORITY AS DISCRIMINATION BOUNDARY LEVEL, AND LOWER DISCRIMINATION BOUNDARY LEVEL SINCE NUMBER OF TRANSMITTABLE BYTES IS NOT REACHED. |
| OFF | ON | | −1 | ON | THIS MEANS THAT BOUNDARY LEVEL OF PACKET TRANSMISSION/ABANDONMENT IS DETERMINED. NUMBER OF TRANSMISSION -PERMITTED FRAME = 0 MAY BE SET. |
| ON | OFF | | +1 | | INCREASE NUMBER OF FRAMES TO BE TRANSMITTED PER CYCLE SINCE NUMBER OF TRANSMITTABLE BYTES IS NOT REACHED. |
| ON | ON | | −1 | ON | (ERROR OCCURRED) |

F I G. 2 2

CODE ASSIGNMENT OF DISCRIMINATION CODE

| | CONTENTS OF COMPARISON ARITHMETIC OPERATION | ASSIGNED BIT | CODE ASSIGNED TO COMPARISON RESULT | | |
|---|---|---|---|---|---|
| | | | > | = | < |
| COMPARISON 1 | PRIORITY:DISCRIMINATION BOUNDARY LEVEL | THIRD AND FOURTH LOWER BITS | 00 | 01 | 10 |
| COMPARISON 2 | CURRENT FRAME COUNTER:NUMBER OF TRANSMISSION-PERMITTED FRAMES | SECOND LOWER BIT | 0 | 1 | 1 |
| COMPARISON 3 | PACKET SIZE + NUMBER OF TRANSMITTED BYTES:req_Bpc | LEAST SIGNIFICANT BIT | 0 | 1 | 1 |

F I G. 2 5

CORRESPONDENCE BETWEEN DISCRIMINATION CODE
AND PROCESSING ITEM

| ASSIGNED CODE | | | PROCESSING ITEM | | | | REMARKS |
|---|---|---|---|---|---|---|---|
| COMPAR-ISON 1 | COMPAR-ISON 2 | COMPAR-ISON 3 | TRANSMIT | ABANDON | BYTE OVER FLAG | FRAME OVER FLAG | |
| 00 | × | × | | ○ | | | LOW PRIORITY |
| 01 | 0 | × | | ○ | | ○ | NUMBER OF TRANSMISSION-PERMITTED FRAMES HAS BEEN EXCEEDED |
| 01 | 1 | 0 | | ○ | ○ | | NUMBER OF TRANSMITTED BYTES HAS BEEN EXCEEDED |
| 01 | 1 | 1 | ○ | | | | PRIORITY OK, NUMBER OF TRANSMITTED BYTES OK |
| 10 | × | 0 | ○ | | | | HIGH PRIORITY |
| 10 | × | 1 | ○ | | ○ | | NUMBER OF TRANSMITTED BYTES HAS BEEN EXCEEDED ALTHOUGH PRIORITY IS HIGH DESIGNATED BIT RATE HAS BEEN REACHED |

FIG. 26

CHANGES IN BIT RATE OF STREAM BY
SHAPING PROCESSING

DATA TRANSMISSION SYSTEM AND METHOD

BACKGROUND OF THE INVENTION

The present invention relates to a data transmission system and method, which process real-time data such as video data, audio data, and the like as packet stream data.

In recent years, along with the development of the computer network techniques and the communication techniques of digital information, a data transfer system for transferring a time-serial data sequence (to be referred to as stream data hereinafter) to realize, e.g., video on demand, has been developed.

In such data transfer system, a video or audio signal of, e.g., a requested movie is converted into digital information to form stream data, which is transmitted from a transmitting system to a receiving system via a network.

In general, in order to distribute data such as video data including audio data via a network, moving image coding such as MPEG (Moving Picture Experts Group), Motion-JPEG (Joint Photographic Coding Experts Group), H.261, or the like is used, and such data is transmitted as an encoded packet stream.

When multimedia data such as audio data, video data, and the like is transferred in real-time on a network shared by a plurality of users, since the required network bandwidth cannot always be assured, the bit rate of an encoded video stream is reduced in correspondence with the available network bandwidth upon transferring the stream.

In one conventional bit rate reduction method, coding processing and stream transfer are performed parallel to each other, and when the bit rate control is required, an encoder is feedback-controlled to adjust the coding parameters (image quality, the number of frames, and the like). However, this method cannot be applied to an on-demand video communication system that transmits pre-stored streams as encoded packet streams since the encoder and data transmission unit depend on each other in the system arrangement.

In the following description, a system in which an encode unit and a data transfer unit are independent from each other, and the data transfer unit reduces the bit rate of an encoded stream will be exemplified. Note that reducing the bit rate of an encoded stream in corresponded that available network bandwidth will be referred to as stream shaping processing hereinafter.

In general, three following stream shaping methods (1) to (3) for video streams are available:

(1) To reduce the number of display frames (time resolution).
(2) To reduce the image size (width, height) (spatial resolution).
(3) To reduce the number of bits per pixel of an original image (the number of gradation levels or color resolution).

For example, when the time resolution of a stream (e.g., Motion-JPEG) which has been intraframe-encoded at 30 frames/sec is halved by the method of reducing the number of display frames to transmit a stream at 15 frames/sec, the boundary of encoded data frame data is detected by stream analysis during the data transmission processing, and data are alternately transmitted and abandoned for every other frames.

On the other hand, when the method of reducing the image size (width, height), i.e., the method of changing the spatial resolution is used, the individual frame data in a stream must be encoded while being separated into low-resolution data and high-resolution expanded data for compensating the low-resolution data (i.e., a hierarchically encoded stream), and the bit rate is reduced by abandoning high-resolution expanded data upon data transfer. In this case, stream shaping as a combination of the spatial resolution or time resolution can be attained.

The term "scalability" in moving image coding means that two or more images having different spatial resolutions and time resolutions can be decoded from a single bitstream. The above-mentioned bit rate control utilizes the scalability of an encoded stream.

MPEG as the international standards of moving image coding describes an encoded stream having a scalability function (to be referred to as a scalably encoded stream hereinafter), but such stream realizes the scalability in a decoder and does not take scalability upon stream transmission into consideration.

For example, MPEG defines the multiplexing method of video and audio data. However, it is not easy to separate a data portion corresponding to a specific picture (e.g., B picture) in a video stream from a multiplexed stream.

As for a method that handles an MPEG video stream, a method of setting a plurality of levels in correspondence with the picture types is known. This method designates one of all data distribute level, B picture abandon level, B, P picture abandon level, and all video abandon level (distribute audio data alone); it allows only discrete rate control.

In a multiplexed stream of video and audio data, the rate control for preferentially transmitting audio data whose quality may deteriorate upon sub-sampling or decimation, and starting to reduce the bit rate from a video stream is known. However, the importances of video and audio data differ depending on the video contents and user's requirements. Also, since a stream that multiplexes a plurality of video data must often be processed, it is a very serious restraint for the user if he or she cannot set the policy of the bit rate control.

If the bit rate control in a relay node or multicast video distribution is taken into consideration, the bit rate control method is preferably independent from the coding scheme. For this purpose, a stream structure used in the bit rate control method must be easily expanded from typical moving image coding schemes such as MPEG, Motion-JPEG, H.261, and the like, and must be suitable for the bit rate control after coding. However, since the conventional method defines a special stream structure format depending on the moving image coding scheme used, and performs the bit rate control using the defined stream, the expandability of the stream structure is limited.

BRIEF SUMMARY OF THE INVENTION

The present invention has been made in consideration of the above situation, and has as its object to provide a data transmission system and method, which can realize dynamic bit rate control corresponding to the available network bandwidth independently of the moving image coding scheme used.

According to the present invention, there is provided a data transmission system comprising:

input means for inputting an encoded stream which is packetized in units of abandonable data, and in which a header including a packet identifier is added to each of packets;

transmission means for transmitting the encoded stream input from the input means onto an network;

designation means for designating a bit rate; and control means for controlling a bit rate upon transmission of the encoded stream by the transmission means by abandoning a specific packet using packet priority determined on the basis of the packet identifier included in the header of each packet in accordance with the bit rate designated by the designation means.

With this arrangement, since stream coding means can generate an encoded stream by simply packetizing encoded data in units of abandonable data independently of the coding scheme itself, the present invention can be applied to a system using any of arbitrary scalable coding schemes such as MPEG, Motion-JPEG, H.261, and the like. That is, the present invention defines only the packetizing method of encoded data. Such packetizing method can be easily expanded from existing coding schemes, and the compatibility of stream transmission/reception means having a bit rate control function can be improved. Also, since the bit rate control is attained by looking up information alone in the packet header without performing any complex stream analysis during stream transmission processing, high-speed processing can be realized.

The stream shaping processing means comprises table generation means for generating a filtering information table in which a correspondence between the packet identifier included in the header of each packet of the encoded stream generated by the stream coding means, and packet priority is registered, and filtering discrimination means for discriminating transmission or abandonment of each of the packets with reference to the filtering information table generated by the table generation means on the basis of the packet identifier included in the header extracted from each packet in the encoded stream to be transmitted.

With this arrangement, the filtering information table is automatically generated on the basis of packet identifiers which are included in headers added by stream coding means and also serve as packet priority levels, and the bit rate control is done using this table. More specifically, since the system comprises the table generation means, the packet identifier can be prevented from being uniquely defined as packet priority.

The table generation means sets the correspondence between the packet identifier and packet priority in accordance with an externally input designation.

With this arrangement, the correspondence between the packet identifiers and packet priority levels registered in the filtering information table is changed externally, i.e., in accordance with user's designations. Therefore, the bit rate control can be made in accordance with user's designations.

The stream coding means generates an encoded stream by cyclically inserting control packets indicating coding cycles, and the stream shaping processing means determines transmission or abandonment of each packet not to exceed an available network bandwidth (or the designated bit rate) while increasing the number of packets to be transmitted in units of cycles discriminated based on the control packets.

With this arrangement, even when the available network bandwidth changes during transmission of an encoded stream, it is checked at cycles discriminated based on the control packets if the current bit rate corresponds to the available network bandwidth, and control is made to sequentially and preferentially transmit packets in the order from those with higher priority levels based on the packet priority levels within the allowable range, thus dynamically coping with changes in network bandwidth.

The stream coding means provides a hierarchical structure to the packet identifier included in the header to express packet priority based on the contents of the individual layers of the hierarchy.

With this arrangement, since the packet identifier can have a hierarchical structure to represent packet priority levels based on the contents of the individual layers of the hierarchy, when the encoded stream to be transmitted is a multiplexed stream, the packet priority levels can be finely set, for example, priority levels can be assigned to the individual multiplexed data.

The stream coding means allows to discriminate if the packet identifier included in the header has absolute packet priority or variable packet priority.

With this arrangement, the presence of absolute packet priority that can not be changed is clearly indicated. For example, if MPEG is used as the coding scheme, an encoded stream have absolute priorities in order of I picture, P picture, and B picture.

The stream coding means can set the packet identifier included in the header to indicate whether or not a packet is abandonable.

With this arrangement, when the quality of decoded data is considerably impaired or decoded data becomes nonsensical data if a packet in the middle of a stream is abandoned like in a stream of audio data which is not hierarchically encoded, user data, and the like, it is clearly indicated that all the packets are to be transmitted without permitting any local packet abandonment or are not to be transmitted at all.

A relay node which is arranged on a network route and is located between a data transmitting system and a data receiving system, comprises reception means for receiving an encoded stream from said transmitting system and stream shaping processing means for determining transmission or abandonment of each of packets in the encoded stream which is packetized in units of abandonable data, in which a header including a packet identifier also serving as packet priority is added to each of the packets, and which is transmitted from the data transmitting system, using priority based on the packet identifier included in the header of each of the packets in units of packets in accordance with an available network bandwidth, and transmission means for transmitting the encoded stream made up of the packets which are determined to be transmitted by the stream shaping processing means to the data receiving system via the network.

With this arrangement, even in the relay node located between the data transmitting system and data receiving system on the network route, stream shaping processing corresponding to the network state (available network bandwidth) to the data receiving system can be performed in the same manner as that in the data transmitting system. That is, the stream shaping processing can be performed for an encoded stream in multiple stages.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a block diagram showing the arrangement of a video communication system including the video transmission system shown in FIG. 2 in the embodiment of the present invention;

FIG. 6A is a view for explaining the packet format (packet header) in the embodiment of the present invention;

FIG. 6B shows example (1) of a data packet in the embodiment of the present invention;

FIG. 6C shows example (2) of a data packet in the embodiment of the present invention;

FIG. 6D shows an example of a control packet in the embodiment of the present invention;

FIG. 7A explains the principle of a packet link in the embodiment of the present invention, and shows a video frame;

FIG. 7B explains the principle of a packet link in the embodiment of the present invention, and shows encoded data of one frame;

FIG. 7C explains the principle of a packet link in the embodiment of the present invention, and discrimination of the frame boundary;

FIG. 8 is a table for explaining the layers of a packet type identifier in the embodiment of the present invention;

FIG. 9 is a table for explaining a partially abandonable flag and an absolute priority flag in the embodiment of the present invention;

FIG. 10A is a table showing an example of assignment of packet type identifiers (assuming MPEG) in the embodiment of the present invention;

FIG. 10B is a table showing an example of assignment of packet type identifiers (assuming Motion-JPEG) in the embodiment of the present invention;

FIG. 11A is a table showing a setting example of the packet priority order (packet identifiers) in the case of a stream consisting of a single program in the embodiment of the present invention;

FIG. 11B is a table showing a setting example of the packet priority order (the correspondence table between the identifiers and priority levels) in the case of a stream consisting of a single program in the embodiment of the present invention;

FIG. 11C is a table showing a setting example of the packet priority order (explanation of packet processing) in the case of a stream consisting of a single program in the embodiment of the present invention;

FIG. 12A is a table showing a setting example of the packet priority order (packet identifiers) in the case of a stream made up of two programs in the embodiment of the present invention;

FIG. 12B is a table showing a setting example of the packet priority order (the correspondence table between the identifiers and priority levels) in the case of a stream made up of two programs in the embodiment of the present invention;

FIG. 12C is a table showing a setting example of the packet priority order (explanation of packet processing) in the case of a stream made up of two programs in the embodiment of the present invention;

FIG. 13 shows a setting example of an identifier-priority correspondence table including partially abandonable/unabandonable flags in the embodiment of the present invention;

FIG. 14 shows an example of a filtering information table in the embodiment of the present invention;

FIG. 15 illustrates the method of discriminating the frame boundary in a multiplexed stream using a link field in the embodiment of the present invention;

FIG. 16 is a flow chart for explaining the outline of the processing of a stream shaping processing unit in the video transmission system in the embodiment of the present invention;

FIG. 18 is a table showing changes over time in packet transmission state of video data in the embodiment of the present invention;

FIG. 22 is a table for explaining the transmission result confirmation processing of the previous cycle in the embodiment of the present invention;

FIG. 25 is a table showing the code assignment of comparison arithmetic operation results upon generation of the discrimination code in the embodiment of the present invention;

FIG. 26 is a table showing the correspondence between the discrimination codes (assigned codes) and the processing contents of the packet processing in the embodiment of the present invention.

DETAILED DESCRIPTION OF THE INVENTION

Figure 1:
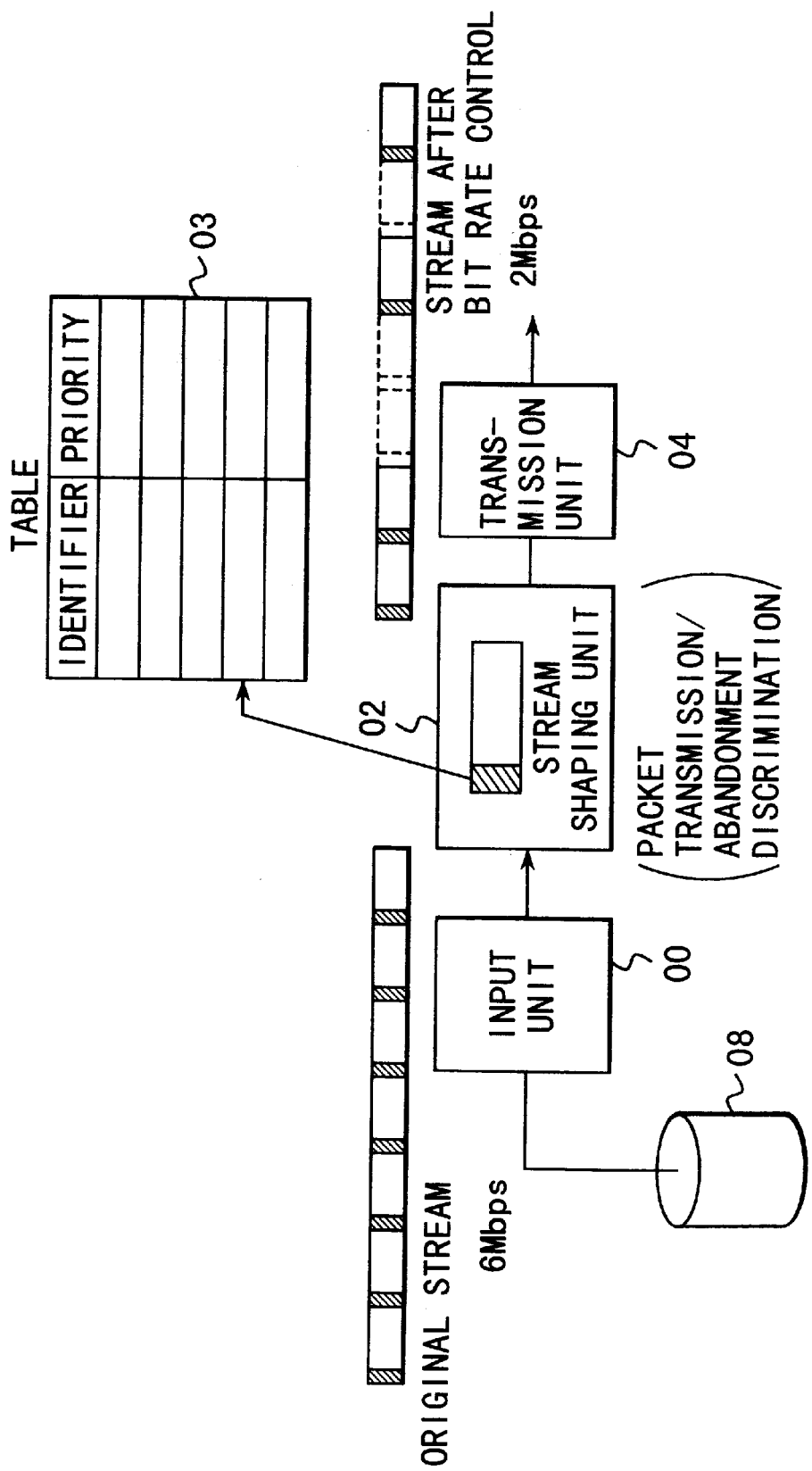
FIG. 1 is a block diagram for explaining the outline of a data transmission system according to the present invention.

The embodiment of the present invention will be described hereinafter with reference to the accompanying drawings. FIG. 1 is a block diagram for explaining the outline of a data transmission system of the present invention. This embodiment will exemplify, as the data transmission system, a video transmission system which transmits video data including audio data as an encoded packet stream.

Outline

The outline of the video transmission system in this embodiment will be described below with reference to the block diagram shown in FIG. 1.

In this embodiment, a stream shaping processing unit 02 having a bit rate control function is added to a video transmission system that processes video streams encoded by MPEG, Motion-JPEG, or the like.

In a network used by a plurality of users, a sufficient network bandwidth (defined by, e.g., bps) required for distributing a video stream (encoded stream) cannot always be assured. For this reason, even when the user wants to transmit a stream at a bit rate of, e.g., 6 Mbps, if a sufficient network bandwidth cannot be assured, the stream must be distributed after its bit rate is reduced to, e.g., 2 Mbps by the bit rate control. Upon bit rate reduction, the quality of the decoded image is preferably prevented from being impaired as much as possible. To achieve this, the video transmission system of this embodiment uses the following method.

An encoded stream is packetized in units of abandonable encoded data, and is stored as a stored stream in an external storage device 08. The stored stream has a stream structure suitable for bit rate control (transmission/abandonment discrimination) by means of packet filtering.

The definition of the stream structure prescribes packetizing of a stream in units of encoded data, cyclical insertion of control packets indicating coding cycles into a stream, and a packet header format (packet identifier also serving as a packet priority level). Since this stream structure or architecture includes no prescriptions about encoded data itself, it can be easily expanded from existing moving image coding schemes such as MPEG, Motion-JPEG, and the like.

The stream shaping processing unit 02 performs stream shaping processing (bit rate control method) for an encoded stream, which is input from an input unit 00 and stored in the external storage unit 08, by packet filtering using packet identifiers, which also serve as packet priority levels and are added to the headers of the individual packets. Thereafter, the unit 02 transmits a stream onto the network via a transmission unit 04.

Upon executing the stream shaping processing, the stream shaping processing unit 02 determines in accordance with the priority assigned to each packet identifier registered in a table 03 if each packet is to be abandoned or transmitted.

To allow bit rate control by numerical value designation, the stream shaping processing unit 02 preferentially transmits packets in the order from those having higher priority levels within the range of the available network bandwidth on the basis of the correspondence between the packet identifiers and priority levels registered in the table 03, and increases the number of packets to be transmitted within the allowable range. As for packets having identical priority within a single cycle, it is determined that the leading one of these packets has higher priority.

The bit rate control method will be briefly described below. Packets having priority higher than that which serves as a boundary upon discriminating if a packet is transmitted/abandoned are unconditionally transmitted, and packets having priority lower than that at the discrimination boundary are unconditionally abandoned. As for packets having the same priority as that at the discrimination boundary, the number of packets to be transmitted is gradually increased as the number of cycles increases. When all the packets which have the same priority as that at the discrimination boundary and are present in a single cycle have been transmitted several cycles later, the priority of the discrimination boundary is lowered to allow transmission of more packets. Upon repeating such processing, the bit rate gradually approaches the designated bit rate. When the bit rate is about to exceed the designated bit rate, increasing of the number of packets to be transmitted is stopped, and thereafter, a nearly steady state is attained. When the correspondence between the packet identifiers and priority levels registered in the table 03 is allowed to be arbitrarily changed, the number of packets to be preferentially output can be changed.

Note that the encoded stream to be transmitted need not always be stored in the external storage unit 08, and an encoded stream which is packetized according to the stream structure prescribed in this embodiment may be directly input. Also, the designated bit rate can be dynamically changed during stream transmission.

System Arrangement
<Video Transmission System>

Figure 2:
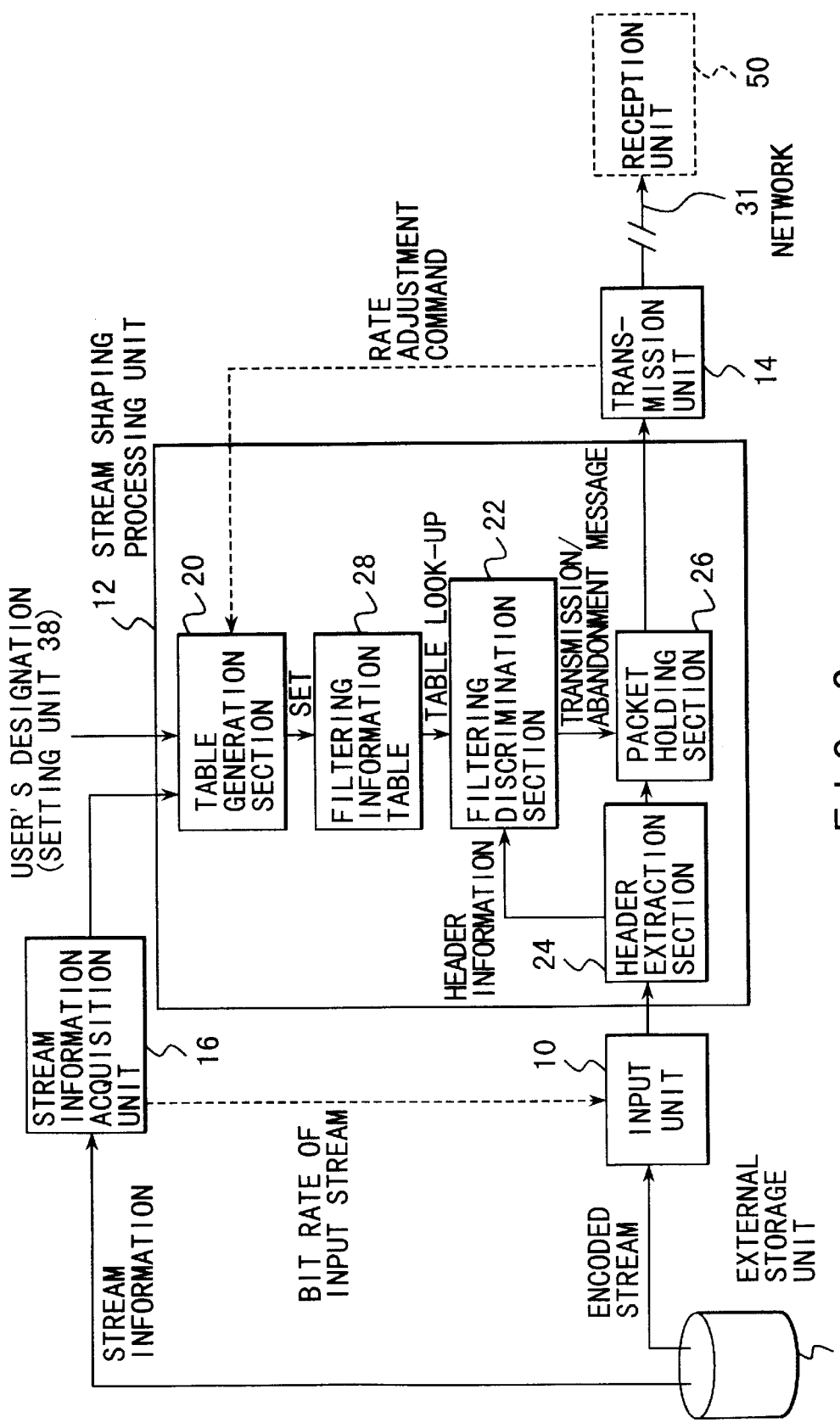
FIG. 2 is a block diagram showing the arrangement of a video transmission system in an embodiment of the present invention.

The arrangement of the video transmission system in this embodiment will be explained below. FIG. 2 is a block diagram showing the arrangement of the video transmission system in this embodiment. The video transmission system in this embodiment comprises an input unit 10, a stream shaping processing unit 12, a transmission unit 14, and a stream information acquisition unit 16.

The input unit 10 reads an encoded stream from an external storage unit 18 comprising, e.g., a hard disk device, and outputs it to the stream shaping processing unit 12 in units of packets. The stream read rate is determined with reference to the bit rate of the encoded stream (input stream) supplied from the stream information acquisition unit 16. The input unit 10 is assumed to have a buffer with a sufficiently large capacity. Note that the input unit 10 may directly receive an encoded stream from an encoder (a stream encoder 34 to be described later).

The stream shaping processing unit 12 reads the encoded stream in units of packets via the input unit 10, and determines using information added to each packet header including packet priority (the packet format will be described in detail later) if each packet is to be transmitted/abandoned. The unit 12 sends to the transmission unit 14 only the packets which are determined to be transmitted. The stream shaping processing unit 12 has not only a function of executing simple packet filtering processing based on the packet priority, but also a function of adjusting the bit rate of the output stream not to exceed the designated target bit rate.

The transmission unit 14 holds the packets received from the stream shaping processing unit 12 in a buffer, and transmits them to a receiving system when the held packets have reached an appropriate data volume. When a target bit rate after stream shaping processing is designated, the transmission unit 14 executes transmission processing while maintaining the designated rate. At this time, coding cycle information may be used. On the other hand, the unit 14 also has a function of outputting a request for lowering the target bit rate to the stream shaping processing unit 12 when the network load is heavy and the designated transmission rate can no longer be maintained.

The stream information acquisition unit 16 reads information associated with packet identifiers (to be described in detail later) which include packet priority levels and are stored in the external storage unit 18 in stream coding processing, and supplies information necessary for stream shaping processing to the stream shaping processing unit 12 on the basis of the read information. The stream information acquisition unit 16 informs the input unit 10 of the bit rate of the input stream.

The stream shaping processing unit 12 will be described in detail below. The stream shaping processing unit 12 comprises a table generation section 20, a filtering discrimination section 22, a header extraction section 24, a packet holding section 26, and a filtering information table 28, as shown in FIG. 2.

The table generation section 20 generates a correspondence table that defines the correspondence between the packet identifiers and packet priority levels on the basis of information associated with the packet identifiers received from the stream information acquisition unit 16, and saves it as the filtering information table 28. Alternatively, the section 20 receives a correspondence table in which the correspondence between the packet identifiers and packet priority levels has already been registered, and saves it as the filtering information table 28. The filtering information table 28 includes information associated with control packets, and a target bit rate (strictly speaking, the maximum number of bytes that can be transmitted during one coding cycle). The table generation section 20 can change the contents of the filtering information table 28 in accordance with an external instruction, i.e., the user's designation (ON/OFF designation of the stream shaping function, priority designation, and bit rate designation (required bit rate)). If there is no user's instruction associated with the priority table, the table generation section 20 generates a default filtering information table using information associated with the packet identifiers alone.

The target bit rate can be dynamically changed during stream transmission. Assume that the target bit rate value is externally input. However, if the system has a means for monitoring the available network resource (band), the bit rate may be dynamically designated using this means. On the other hand, when the transmission unit 14 can detect the back pressure of the network, it may have a function of transmitting a target bit rate change request (rate adjustment command) to the stream shaping processing unit 12.

The header extraction section 24 copies header portions (header information) from the packets received from the input unit 10, and sends them to the filtering discrimination section 22. Also, the section 24 sends the packets (including the headers) to the packet holding section 26.

The packet holding section 26 temporarily holds the packets received from the header extraction section 24, and executes packet processing in accordance with transmission/abandonment determination messages from the filtering discrimination section 22. When a packet is to be transmitted, the section 26 transmits it to the transmission unit 14 without deleting its header. When there is no relay node (to be described later) having a stream shaping function in the network that connects a transmitting system and the receiving system, and the receiving system requests an encoded stream from which packet headers are deleted, the section 26 may delete the header portions and transfer only data to the transmission unit. The header deletion function may be assigned to the header extraction unit 24.

The filtering discrimination section 22 obtains packet priority levels by looking up the filtering information table 28 using the packet identifiers included in the header information sent from the header extraction section 24 as keys, executes filtering discrimination on the basis of the obtained packet priority levels, and sends discrimination results to the packet holding section 26. The filtering discrimination determines transmission/abandonment in units of packets. If the bit rate is designated the number of packets to be transmitted is gradually increased in the order from packets with highest priority to packets with lower priority levels (with reference to cycle informing packets (to be described later)) so as not to exceed the designated bit rate. When the filtering function is OFF, the section 22 sends all packets to the transmission unit 14.

<Video Communication System Including Video Transmission System>

The arrangement of the video communication system including the video transmission system shown in FIG. 2 will be described below. FIG. 3 is a block diagram showing the arrangement of the video communication system in this embodiment. As shown in FIG. 3, the video communication system is built by a transmitting system 30, a network 31, and a receiving system 32. The transmitting system 30 includes the video transmission system shown in FIG. 2.

The transmitting system 30 comprises a stream coding unit 34, the external storage unit 18, and a video transmission unit 36.

The stream coding unit 34 comprises a video/audio coding unit 40 and a packet processing unit 42.

The video/audio coding unit 40 performs coding processing for an input video signal, and outputs encoded data to the packet processing unit 42. In this embodiment, the type of coding scheme is not particularly limited. For example, moving image coding such as MPEG, Motion-JPEG, H.261, and the like is used. Note that the encoded data has a structure suitable for packet processing.

The packet processing unit 42 executes processing for packetizing the encoded data output from the video/audio coding unit 40 in correspondence with the prescribed stream structure (to be described in detail later) unique to this embodiment, and generates an encoded packet stream. The packet processing in the packet processing unit 42 absorbs differences of various coding schemes used in the video/audio coding unit 40. On the other hand, control packets are inserted into the stream in the stream coding unit 34.

Note that a packet is the basic unit of packet filtering in the stream shaping processing unit 12, and the header portion (header information) of each packet has a packet type identifier added thereto. The packet type identifier is an identifier indicating the type of packet, and can be hierarchically set. Note that information associated with the correspondence between the packet type identifier and the packet type (video, audio, or the like) indicating the contents of actual encoded data may be saved as another file or as a control packet at the head of the stream.

The encoded stream output from the stream coding unit 34 is stored in the external storage unit 18 or is directly supplied to the video transmission unit 36. In this case, the video/audio coding unit 40 that performs coding processing and the packet processing unit 42 that performs packet processing are separated, and their processing operations are executed sequentially but may be executed at the same time. On the other hand, the stream coding unit 34 may have a function of multiplexing a plurality of video signals to form a single stream.

The video transmission unit 36 corresponds to the video transmission system shown in FIG. 2. The video transmission unit 36 not only generates the correspondence table between the packet identifiers and packet priority levels using only stream information acquired by the stream information acquisition unit 16, but also can reflect externally input user's designations (ON/OFF designation of the stream shaping function, priority designation, and bit rate designation).

A setting unit 38 is arranged to allow the user to externally input his or her designation (information for generating the filtering information table) to the video transmission unit 36. The setting unit 38 has an appropriate GUI (Graphical User Interface), and can present to the user information associated with the packet type identifiers indicating priority levels and the like in the stream, and the actual packet types (video, audio, or the like) on, e.g., a display device (not shown). When the setting unit 38 detects a designation for changing the presented contents input by the user, it informs the table generation section 20 in the stream shaping processing unit 12 of it. Also, the setting unit 38 receives the designated number of bits (requested bit rate) of transmission data per sec, which indicates the available network bandwidth, and informs the table generation section 20 of it.

Note that the setting unit 38 not only inputs user's designations in the transmitting system 30, but also can receive designations input at the receiving system 32 via the network and can reflect them in the correspondence table (e.g., can change the priority order or the like) if it is connected to the receiving system 32 via the network.

On the other hand, the receiving system 32 comprises a reception unit 50 and a stream decoding unit 52.

The reception unit 50 receives the encoded stream via the network 31 and sends it to the stream decoding unit 52.

The stream decoding unit 52 comprises a packet disassembly processing unit 60 and a video/audio decoding processing unit 62.

The packet disassembly processing unit 60 removes the packet headers added for the stream shaping processing to reconstruct the pure encoded stream, and sends it to the video/audio decoding processing unit 62.

The video/audio decoding processing unit 62 decodes the pure encoded stream sent from the packet disassembly processing unit 60 to obtain video/audio signals, and outputs the decoded signals. In this case, the packet disassembling processing in the packet disassembly processing unit 60 and the decoding processing in the video/audio decoding processing unit 62 are separated, but may be executed concurrently. Alternatively, a (pure) encoded stream from which the packet headers are removed may be received.

<Stream Relay Node With Stream Shaping Function>

Figure 4:
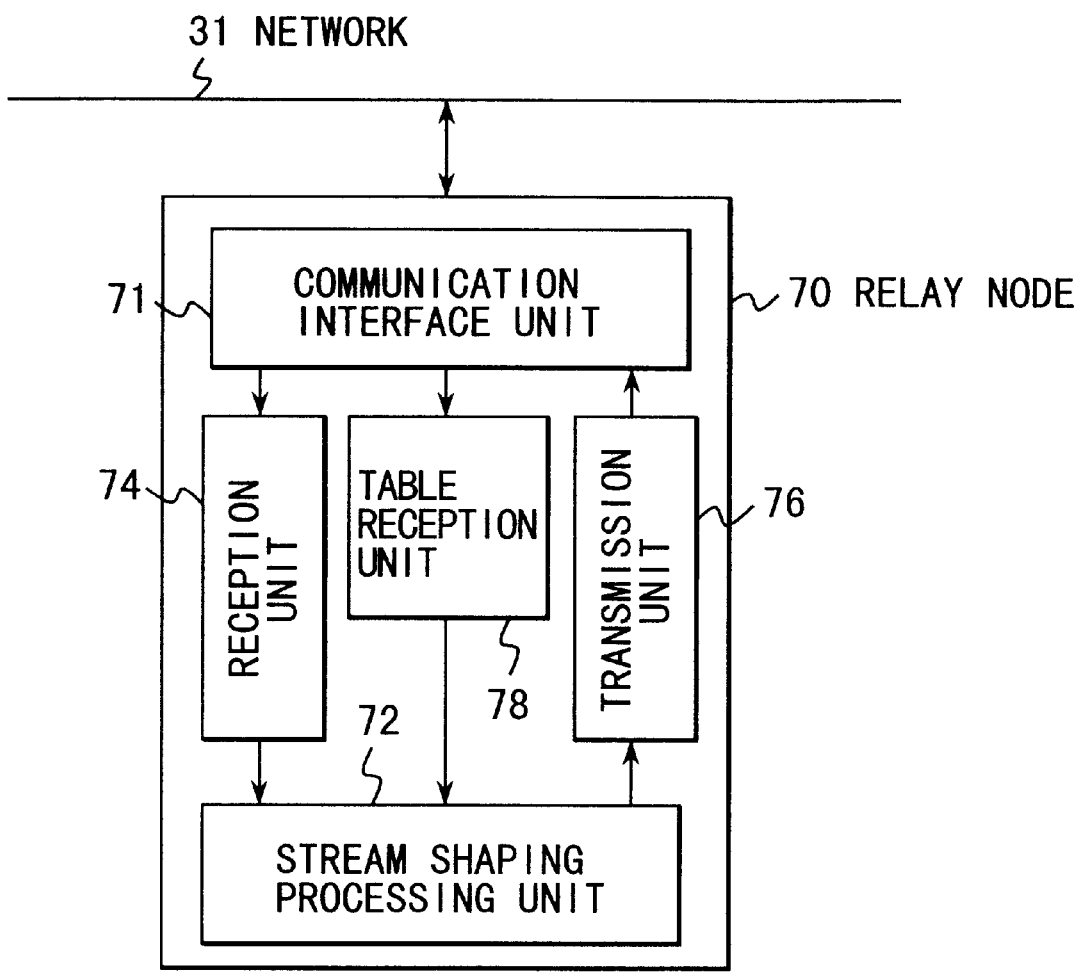
FIG. 4 is a block diagram showing the arrangement of a relay node having a stream shaping function in the embodiment of the present invention.

FIG. 4 shows the arrangement of a relay node 70 with the stream shaping function.

The relay node 70 is arranged on the route of the network 31 between the transmitting system 30 and the receiving system 32. The relay node 70 is used for absorbing different transmission rates of encoded streams between, e.g., networks with different network bandwidth, and an arbitrary number of relay nodes can be set at arbitrary locations.

As shown in FIG. 4, the relay node 70 comprises a communication interface unit 71, a stream shaping processing unit 72, a reception unit 74, a transmission unit 76, and a table reception unit 78.

The communication interface unit 71 is an interface that exchanges an encoded stream (and a filtering information table) with the network 31. The unit 71 outputs the received encoded stream to the reception unit 74, and outputs the stream-shaped encoded stream from the transmission unit 76 onto the network 31.

The stream shaping processing unit 72 has the same functions as those of the stream shaping processing unit 12 shown in FIG. 2 (a detailed description thereof will be omitted).

The reception unit 74 and the transmission unit 76 respectively have the same functions as those of the input unit 10 and the transmission unit 14 shown in FIG. 2, and a detailed description thereof will be omitted.

The table reception unit 78 receives the filtering information table in which the correspondence between the packet identifiers and packet priority levels is registered from the communication interface unit 71 via the network, and provides it to the stream shaping processing unit 72. Note that the filtering information table may be inserted in a stream as a control packet.

When the above-mentioned relay node 70 is inserted between the transmitting system 30 and the receiving system 32, a plurality of stream shaping processing units are connected until the encoded packet stream reaches the receiving system 32. The stream shaping processing unit 12 in the video transmission unit 36, and the stream shaping processing unit 72 in the relay node 70 respectively execute the stream shaping processing for the encoded stream by looking up the filtering information table. Upon executing multicast communications in non-equal networks, each relay node has filtering information tables (and other parameters required for the bit rate control) corresponding in number to transmission nodes, and the bit rate control is done in correspondence with the available network bandwidth between the relay node and each transmission node.

Stream Structure

The structure of the encoded stream in this embodiment will be described in detail below. The encoded stream in this embodiment has the following features.

(1) It is a packet stream that handles real-time data such as video data, audio data, and the like.

(2) It multiplexes a plurality of types of data (video, audio).

(3) It can be either an intraframe encoded stream (e.g., Motion-JPEG) or an interframe predictive encoded stream (e.g., MPEG).

(4) It is premised of the assumption that data can be dropped in units of packets.

(5) It defines the packet structure alone (independent from the coding scheme).

(6) It includes a packet type identifier in the header of each packet.

(7) It allows insertion of statistical information and control information associated with the stream as a control packet.

(8) It has control packets indicating coding cycles cyclically inserted.

The stream structure will be described in detail below.

The stream structure of this embodiment is used for a fixed-length encoded stream of an arbitrary coding scheme (MPEG, Motion-JPEG, H.261, and the like). Note that a stream must have a stream structure which is packetized in units of abandonable encoded data (e.g., video data for one frame), and in which a header is added to each packet. The header of each packet has a packet type identifier added thereto. This identifier also serves as packet priority, and stream shaping processing is attained by packet filtering using this priority.

The packet filtering determines transmission/abandonment in units of packets. Therefore, one packet must not include more than one encoded data units (for example, one packet must not include encoded data across two frames).

Conversely, one encoded data unit can be divided into a plurality of packets (for example, video data for one frame is broken up into a plurality of packets). In this case, there must be an indication that clearly shows the data in the plurality of packets belong to a single encoded data unit. For this purpose, a field indicating the link relationship with the previous and next packets is prepared in the packet header. Such field is prepared to facilitate the packet filtering processing.

In the above example, a frame is exemplified as the encoded data unit. On the other hand, when one frame data is hierarchically encoded and is divided into a low-resolution component and a high-resolution component that compensates for the low-resolution component, these components are respectively processed as individual encoded data units.

The stream can include a control packet that has a special identifier. This control packet is used for inserting statistical information and control information into the stream.

Figure 5:
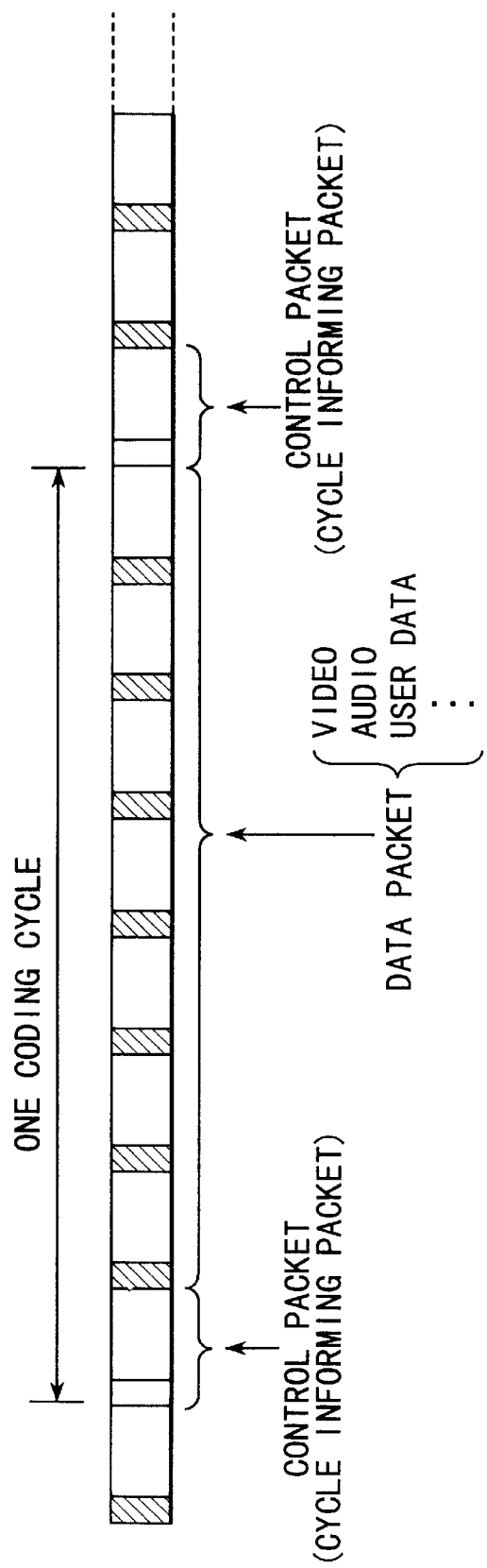
FIG. 5 is a view for explaining the structure of an encoded stream used in the embodiment of the present invention.

More specifically, as shown in FIG. 5, control packets indicating coding cycles are inserted, and filtering processing and bit rate control are done with reference to these packets. Note that the coding cycle indicates the cycle of coding processing like a GOP (Group of Picture) structure in MPEG. In the case of Motion-JPEG, the coding cycle is defined with reference to the frame rate. The control packet can also be used for informing the relay node or receiving node of the data size abandoned by filtering, and the like.

This stream structure prescribes only the packet processing method and the information to be added as the header. If an encoder and decoder are designed to keep such prescriptions, the bit rate control method in this embodiment can be applied to arbitrary coding schemes.

Packet Header

The header information to be added to each packet in the encoded stream in this embodiment will be described below. The packet header in this embodiment has the following features.

(1) It has a synchronization bit field, link field, packet type identifier field, and packet length field (the link field and packet length field are not indispensable).

(2) It allows identification of control packets and stream data packets by checking a specific bit in the packet type identifier.

(3) It allows confirmation of the link relationship with the previous and next packets (having the same packet type identifier) by checking the link field.

(4) Its packet type identifier field can be divided into a plurality of subfields to have a hierarchical structure.

(5) Its packet type identifier also serves as packet priority.

(6) Its packet type identifier field can have a flag that distinguishes absolute priority and variable priority from each other.

(7) Its packet type identifier field can have a flag that distinguishes a partially abandonable packet and a partially unabandonable packet from each other.

The packet header will be described in detail below with reference to the accompanying drawings.

As shown in FIG. 6A, the packet header is made up of a synchronization bit field, link field, packet type identifier field, and packet length field. Each field size is not prescribed. However, the packet header size preferably is a fixed length (for attaining high-speed processing). If the payload size of the packet is a fixed length, the packet length field is not necessary.

(a) The synchronization bit field is added for the purpose of detecting the packet header from the stream, and a fixed bit sequence is written in this field to allow easy header detection. The packet type identifier indicates the type of data included in the payload of the packet.

(b) The link field indicates the link state in each packet with respect to the previous and next packets when encoded data for one video frame is divided into a plurality of packets, as shown in FIGS. 7A to 7C. Since the link field is added, if the previous packet is abandoned by filtering processing and the packet of interest has a link relationship with the previous packet, the packet of interest can be automatically determined as the packet to be abandoned. The link field is prepared to facilitate packet filtering processing. When packets having the same packet type identifiers continue, the link field serves as a boundary of adjacent packets. The following example expresses the link relationship with the previous and next packets using 2 bits:

(00): independent packet (no link relationship)

(01): having a link with the next packet having the same identifier (11): having a link with the previous and next packets having the same identifier (10): having a link with the next packet having the same identifier In a stream in which a plurality of types of data are multiplexed, packets having different packet type identifiers are mixed. For this reason, a packet having a different packet type identifier may be inserted between packets that are linked.

(c) The packet length field indicates the payload length (or packet length) of the packet. The stream shaping processing looks up the packet header alone, but does not look up any data in the payload. For this reason, the packet length information is added to allow easy detection of the packet header in the stream.

The payload that follows the packet header includes one encoded data unit or its portion. The encoded data unit indicates a data unit (e.g., data for one video frame) which does not have a serious influence on decoding processing in a decoder (i.e., does not seriously deteriorate image quality) if it is dropped from the stream. Note that data units may have a priority order like I, P, and B pictures (Intra-Picture, Predictive-Picture, Bidirectionally Predictive-Picture) in MPEG.

(d) The packet type identifier is used for discriminating the packet type. The most significant bit in the packet type identifier field serves as a control flag for distinguishing a control packet and a data packet from each other.

The packet type identifier also serves as packet priority. "The packet type identifier also serving as packet priority" has the following meaning. The packet type identifier is added upon stream coding. For this reason, if "identifier= priority" is permanently determined, the user's demand (e.g., for changing the priority order of video and audio data) can no longer be reflected. In view of this problem, the packet type identifier serves as default packet priority.

The packet type identifier field can be divided into a plurality of subfields to have a hierarchical structure, as shown in FIGS. 6B, 6C, and 6D.

In order to explain the hierarchical structure of the packet type identifier, an MPEG stream in which two programs as sets of video data and audio data, and other additional data are multiplexed will be examined below. In this case, as shown in FIG. 8, the packet type identifier has three layers "program", "data type", and "picture type".

For example, when program 1 alone is extracted from this multiplexed stream and is transmitted, packet distribution/ abandonment can be determined by looking up only the packet type identifier in the first layer. On the other hand, when P and B pictures are to be dropped in an MPEG video stream, the packet type identifiers must be checked up to the third layers. Such hierarchical structure of the identifiers is also effective in terms of data management.

When a hierarchical structure is provided to the packet type identifier field, bits assigned to this field are distributed to the individual layers. In this case, the bits are distributed so that the subfield including upper bits serves as an upper layer. As for assignment of the number of an identifier, a smaller value is assigned to a packet type with higher priority in principle. This is to allow use of the identifier as (default) priority even when the boundary between the individual layers of the identifier field or the correspondence between the identifier and the actual data type cannot be detected.

The MPEG stream is an interframe predictive encoded stream, and has three different picture types, i.e., I, P, and B. In order to decode P and B pictures, decoded data of I and P pictures are required. More specifically, the MPEG stream has absolute priority of I, P, and B pictures in the order named. Upon packet filtering, the quality of the decoded image considerably suffers unless this priority is kept. To prevent this, a flag indicating absolute priority (absolute priority flag) is prepared at the least significant bit of each identifier subfield. If this flag is "1", it indicates that the identifier in this layer has absolute priority.

In this case, streams of audio data and user data are assumed to be not hierarchically encoded. For this reason, if a packet in the middle of the stream is abandoned, the quality deteriorates markedly, or data transmitted after the packet is abandoned becomes nonsensical. Such stream is preferably subjected to processing for determining whether all packets are to be transmitted without allowing any packet abandonment or are not to be transmitted at all. For this reason, a flag (partially abandonable flag) indicating if the stream is partially abandonable is prepared at the second lower bit of each identifier subfield. If this flag is "1", it indicates that the stream is partially abandonable.

FIG. 9 is a table for explaining the partially abandonable flag and the absolute priority flag. These two flags are not indispensable. If a sufficient size cannot be assured for the identifier field, a table that defines the correspondence among the identifier subfields, partially abandonable flag, and absolute priority flag may be prepared without adding these flags to the identifier field.

FIG. 10A shows an example of assignment of packet type identifiers while assuming an MPEG stream, and FIG. 10B shows an example of assignment of packet type identifiers while assuming a Motion-JPEG stream. In FIGS. 10A and 10B, each packet type identifier field has two layers, i.e., data type and frame type (equivalent to picture type), 4 bits are assigned to each layer, and the absolute priority flag and partially abandonable flag are added.

"System" shown in the column of "frame type" in FIG. 10A indicates a GOP header or the like in a layer higher than the picture header of an MPEG video stream. In this example, the identifier of the second layer has 4 bits, the least significant bit and the second lower bit of which are respectively the partially abandonable flag and the absolute priority flag. Thus, using the upper 2 bits, the identifiers of system, I, P, and B pictures are assigned. In this case, in order to allow use of these identifiers as default priority levels, higher priority is assigned to an identifier having higher importance in the coding processing (i.e., the identifier assumes a smaller value).

On the other hand, since there is no absolute priority order among video, audio, and user data shown in FIGS. 10A and 10B, the least significant bit of the first layer is set at "0", and identifiers are assigned to three data types using the upper 2 bits. The priority order of this portion can be changed by the user. As for audio and user data, the partially abandonable flag is turned off ("0"), and as for video data, the flag is turned on ("1").

Since Motion-JPEG used in FIG. 10B is intraframe coding, the individual frames have no priority. More specifically, since the frame types of video data need not be distinguished from each other, the identifier in the second layer is not necessary. However, this also means that there is no lead for determining the frame to be abandoned first. To solve this problem, in FIG. 10B, identifiers are assigned to even and odd frames (but the frames do not have any absolute priority). In this manner, the frame abandonment order may be determined upon coding using the identifiers.

Note that turning off the partially abandonable flag does not means that packet abandonment is absolutely inhibited. Especially, when a middle priority level is set for partially unabandonable data, this data will be partially abandoned with high possibility. In order to avoid this, the highest or lowest priority level is assigned to partially unabandonable data.

Packet Priority

The packet priority will be explained below. The packet priority in this embodiment has the following features.

(1) It directly uses the packet identifier.

(2) It can be changed in correspondence with the user's demand. However, if the absolute priority flag and partially abandonable flag are used, they must be taken into consideration.

(3) It assumes preparation of a correspondence table between the packet identifiers and packet priority levels.

(4) It includes a level that indicates "always transmit" and a level that indicates "always abandon".

The packet priority in this embodiment will be explained in detail below.

The packet identifier can be used as packet priority without any modifications, but the packet priority order may be changed prior to stream transmission. In order to change the priority order, the relationship between the packet identifiers included in the stream and the attributes (video, audio, and the like) of the packets must be presented in the form that can be understood by the user. The information (stream information) for this purpose is saved in the form of a file independent from the encoded stream or in the form of a control packet added to the head of the stream.

In order to allow the user to set the priority order, the means for presenting the identifiers and their contents (setting unit 38), and means (table generation section 20) for changing the set priority order are prepared. In this case, the priority order of portions that have the absolute priority order (determined depending on the coding scheme) is inhibited from being changed.

Even packets with absolute priority may be set at "always transmit" priority levels in the order from those with higher priority levels or may be set at "always abandon" priority levels in the order from packets with lower priority.

The method of setting the packet priority order will be explained below.

The packet type identifiers indicate the priority order of packets but assume discrete values (since they have a hierarchical structure). The user may change the priority order in some cases. Therefore, a correspondence table between the packet type identifiers and packet priority levels is prepared to determine an identifier which has priority higher (lower) by one level than that of a given identifier.

FIGS. 11A to 11C show a setting example of the packet priority order of a stream consisting of a single program, and FIGS. 12A to 12C show a setting example of the priority order of a stream including two programs. Note that the program indicates a stream made up of a plurality of video, audio, and user data. FIGS. 11B and 12B show examples of the correspondence table between the packet type identifiers and priority levels. A priority setting example D in FIG. 12B will be explained below.

As can be seen from FIGS. 12A to 12C, this stream includes two programs, each of which includes an audio stream. Since program 2 is set at priority lower than program 1, program 1 is transmitted first, and thereafter, packets belonging to program 2 are gradually transmitted if there is a margin. In program 2, an audio packet has highest priority, and is set as a partially unabandonable packet (see FIG. 12A). In this manner, some packets are partially unabandonable although they have middle priority levels. Whether or not a packet is partially abandonable can be confirmed by checking the specific bit in the identifier. Also, a flag indicating if a packet is partially abandonable/unabandonable may be prepared in a correspondence table (identifier-priority correspondence table), as shown in FIG. 13.

Note that the packet priority levels always assume successive values. However, "0×00" that means "always transmit" and "0×FF" that means "always abandon" need not be successive values.

Information Required for Stream Shaping

The information required for the stream shaping processing will be described in detail below.

<Information Saved Upon Coding>

Each information to be listed below is saved together with the encoded stream in coding processing, and is required for the bit rate control upon stream shaping. Such information (stream information) is acquired by the stream information acquisition unit 16 prior to the start of stream transmission.

(1) Bit Rate of Encoded Stream

The bit rate of an original encoded stream is informed. The informed bit rate is used as the reading rate of the encoded stream from the external storage unit 18.

(2) Hierarchical Structure and Priority of Packet Type Identifiers Included in Stream The correspondence table between all the packet type identifiers included in the stream and their attributes (video, audio, and the like, i.e., information the data type of which the user can discriminate) is saved upon coding. When each packet identifier field has a hierarchical structure, the numbers of bits of the individual layers are also given. These data are required when the user sets packet priority.

(3) Time of One Coding Cycle

It is premised on the assumption that the coding processing of a video stream has cyclicity. Control packets that indicate coding cycles are inserted into a stream to teach given time intervals. This value is used for obtaining the number of bytes to be transmitted per coding cycle. For example, when the GOP (Group of Picture) in the MPEG is used as one coding cycle, the reproduction (transmission) time of data for one GOP is given.

(4) Packet Header Structure

When the synchronization bit field, identifier field, and the like of the packet header have variable sizes, information associated with the packet structure is given (such information is not necessary if the header structure is fixed).

(5) Information Associated with Control Packet

Information indicating the correspondence between the packet identifiers and the meanings of control packets is given (prescribed). In this case, assume that cycle informing packets and a stream end packet indicating the end of the stream are inserted. Also, a packet for informing the receiving system of the parameters and the like of the transmitting system can be prepared.

<Parameters Acquired Before Beginning of Stream Transmission>

(1) ON/OFF and Mode of Packet Filtering Function

When a stream is to be directly transmitted, the filtering function is allowed to be turned off. There are two filtering modes, i.e., simple filtering processing, and filtering processing with the bit rate control.

(2) Designated Bit Rate

Upon executing the packet filtering processing with the bit rate control, the bit rate of a stream after processing is designated. Inside the system, the designated bit rate is held in the form of the number of transmittable bytes (Bpc: Bytes per cycle) per coding cycle.

(3) Information Associated with Changes in Packet Priority

When the user changes packet priority, this information is acquired. Finally, this information is saved as the filtering information table 28, i.e., the correspondence table between the identifiers and priority levels.

<Contents of Filtering Information Table: 3 Types>

(1) Correspondence Table Between Packet Identifiers and Packet Priority Levels

The correspondence table between the packet identifiers and packet priority levels is generated in consideration of the default priority levels of the packet identifiers and the user's setting. FIG. 14 shows an example of the filtering information table. In this example, the priority levels assume values ranging from 0×00 to 0×FF expressed by 8 bits. As the value is smaller, the priority is higher. 0×00 indicates a packet to be "always transmitted", and 0×FF indicates a packet to be "always abandoned" (priority need not always be expressed by 8 bits).

Note that packets having different identifiers but the same priority must not be present, and the packet priority levels must assume successive values.

(2) Number of Transmittable Bytes per Cycle (req_Bpc)

This value indicates the number of data bytes that can be transmitted per cycle (the interval between adjacent control packets indicating the coding cycles). Normally, the required bit rate (available network bandwidth) is given as the number of bits per second (bps: bits per second) of transmission data, and the value obtained by converting this value into Bpc (Bytes per cycle) is held in the table.

Bpc can be changed in accordance with an external instruction during stream transmission. (If Bpc is changed to a smaller value, the discrimination boundary priority level (discrimination boundary level; to be described later) is initialized. If Bpc is changed to a larger value, the filtering discrimination processing continues.)

(3) Information Associated With Control Packet

In this embodiment, cycle informing packets and a stream end packet are used. The correspondence between the identifiers and the attributes (cycle information, stream end) of control packets is assumed to be determined in advance.

<Data Held by Filtering Discrimination Section 22>

(1) Header Information of Packet to be Filtered

The contents of the packet type identifier field, link field, and packet length fields are copied. The data in the packet length field is used for counting the number of transmitted bytes. (When the data in the packet length field indicates the payload size, the header size is added thereto.)

(2) Discrimination Boundary Level (boundary_level)

This level corresponds to the packet priority level serving as the discrimination boundary upon determining whether a given packet is to be transmitted or abandoned. A packet with priority having a value smaller than the discrimination boundary level (i.e., higher priority) is determined to be "transmitted". Conversely, a packet with priority having a value larger than the discrimination boundary level (i.e., lower priority) is determined to be "abandoned". Packets with priority having the same value as the discrimination boundary level are subjected to filtering discrimination on the basis of their packet sizes, the number of transmitted bytes, and the value Bpc.

Upon completion of packet discrimination for one cycle, if there is no result or record of frame abandonment, the value of the discrimination boundary level is incremented by one (to lower the discrimination boundary level).

Even when packets with priority having values smaller than that of the discrimination boundary level are transmitted, confirmation processing is executed based on their packet sizes, the number of transmitted bytes, and the value Bpc.

(3) Number of Transmitted Bytes (now_Bpc)

The packet sizes transmitted within one coding cycle are summed up. This value is reset for each cycle.

(4) Frame Counter (frame_count)

A frame indicates the encoded data unit (data abandonment unit). In the case of video data, the frame corresponds to data for one frame. In the case of audio data, there is no idea of frame when it is not hierarchically encoded. The frame counter counts the number of frames that have the same priority as the discrimination boundary level present in one cycle. Data for one frame is divided into a plurality of packets in some cases. Accordingly, upon counting the number of frames, it is checked by looking up the link field in each packet header if the packet corresponds to a frame head packet. The frame counter is reset for each cycle. FIG. 15 shows the method of discriminating the frame boundary in a multiplexed stream using the link field.

(5) Number of Transmission-permitted Frames (permit_frames)

This value indicates the number of frames which are permitted to be transmitted during one cycle and have the same priority as the discrimination boundary level. After packets for one cycle have been transmitted, if the number of transmitted bytes in practice has not reached the number of transmittable bytes, this value is incremented by one (to gradually increase the number of frames to be transmitted during one cycle).

(6) Abandonment Result Flag

The abandonment result flag includes a byte over flag and a frame over flag. Using these flags, whether or not the number of packets to be transmitted per cycle is to be increased is determined.

(a) Byte Over Flag (bytes_over_flag)

This flag indicates that there is an abandonment result of packets having the same priority as the discrimination boundary level since the number of transmittable bytes would have been exceeded if they were not abandoned. This flag is reset for each cycle. When this flag is OFF, it means that there is no packet abandonment result; if the flag is ON, it means that there is a packet abandonment result.

(b) Frame Over Flag (frame_over_flag)

This flag indicates that there is an abandonment result of packets having the same priority as the discrimination boundary level since the number of transmission-permitted frames would have been exceeded if they were not abandoned. This flag is reset for each cycle.

(7) Fix Flag (fix_flag)

This flag indicates that the number of packets to be transmitted is not increased any more since the data volume transmitted per cycle has reached the number of transmittable bytes.

The operation of this embodiment will be described below.

Stream Shaping Processing

FIG. 16 is a flow chart for explaining the out line of the processing of the stream shaping processing unit in the video transmission system of the present invention. The stream shaping processing will be described below with reference to the flow chart shown in FIG. 16.

The stream shaping processing unit 12 performs initialization processing, generation of the filtering information table 28 by the table generation section 20, and the like prior to stream transmission (step A1). Thereafter, the stream shaping processing unit 12 starts the stream shaping processing simultaneously with the beginning of transmission of an encoded stream from the input unit 10.

The header extraction section 24 detects the packet headers from the encoded stream (step A2). The header extraction section 24 extracts the packet header portions used in filtering discrimination and transfers them as header information to the filtering discrimination section 22. Also, the section 24 transfers packets to the packet holding section 26 to store them in the section 26 (step A3).

The filtering discrimination section 22 executes filtering discrimination on the basis of information included in the header information, and informs the packet holding section 26 of the discrimination result (step A4). As a result of discrimination, if it is determined that the packet of interest is to be transmitted, the packet holding section 26 outputs the held packet of interest to the next transmission unit 14 (step A5). On the other hand, if it is determined that the packet of interest is to be abandoned, the packet holding section 26 drops the packet of interest.

If the encoded stream input from the input unit 10 has not reached its stream end and packets still remain, the same processing is repeated for the subsequent packets. If the stream end has been reached, the processing ends (step A6).

The stream shaping processing is executed by packet filtering. The packet filtering method includes the following two methods.

(1) Simple Filtering Discrimination Processing (2) Filtering Discrimination Processing with Bit Rate Control These filtering methods will be described in detail in turn below.

<Simple Filtering Discrimination>

Figure 17:
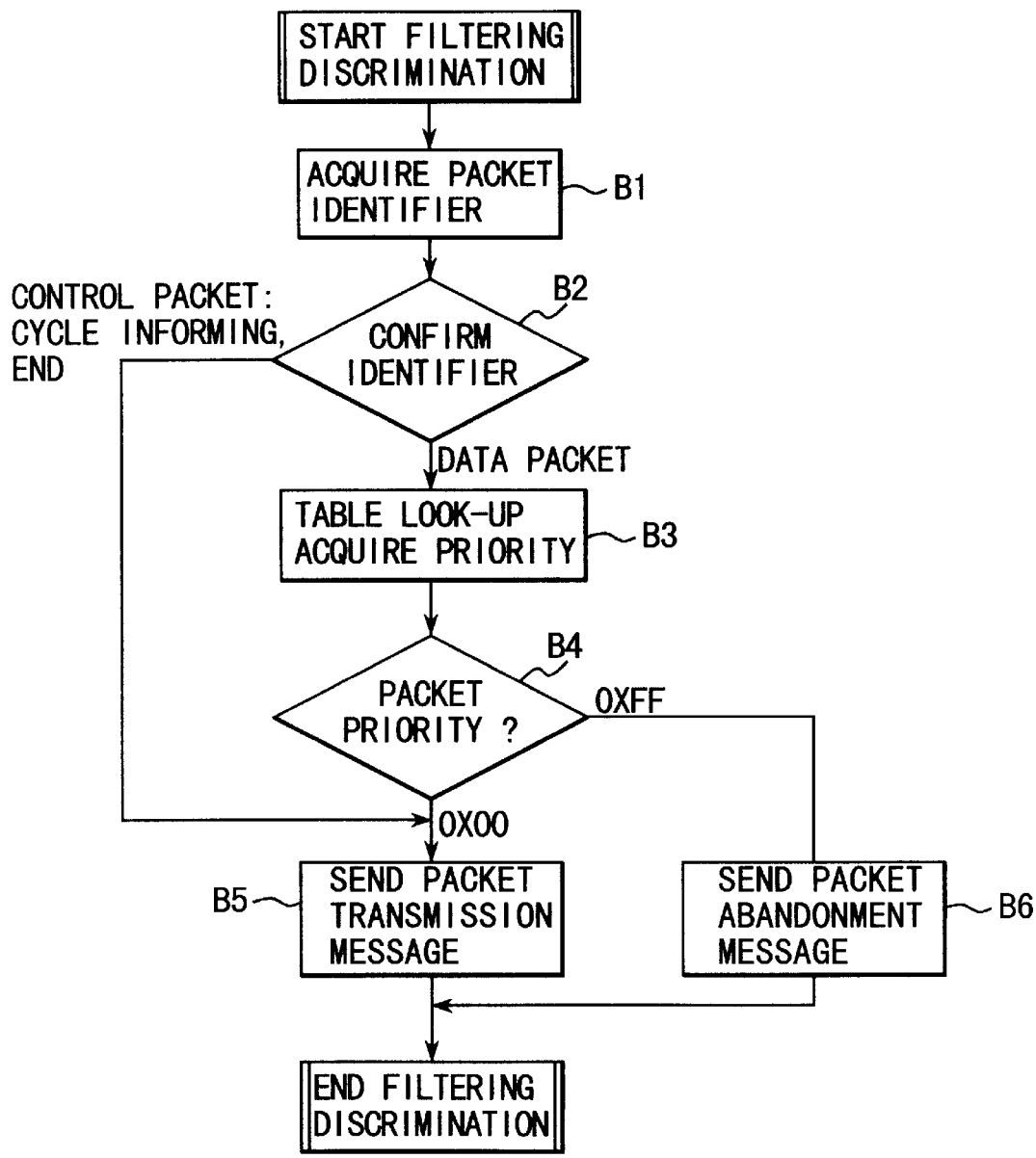
FIG. 17 is a flow chart showing the simple filtering discrimination processing in the embodiment of the present invention.

FIG. 17 is a flow chart showing the simple filtering discrimination processing. In simple filtering discrimination, whether packets are to be transmitted or abandoned is simply determined using the packet identifier values alone. In order to attain this processing, the priority level (0x00) indicating "always transmit" and the priority level (0xFF) indicating "always abandon" must be set in the correspondence table between the packet identifiers and packet priority levels.

When filtering discrimination is started, the filtering discrimination section 22 acquires the packet identifier from each header (step B1).

If the acquired packet identifier indicates a control packet (i.e., a cycle informing packet or stream end packet), the filtering discrimination section 22 outputs a packet transmission message to the packet holding section 26, and ends the filtering discrimination processing (may inhibit the control packets from being transmitted to the receiving system).

On the other hand, if the acquired packet identifier indicates a data packet itself, the filtering discrimination section 22 looks up the filtering information table 28 using the identifier as a key to acquire the packet priority level corresponding to the identifier (step B3).

If the acquired packet priority level indicates "always transmit" (0x00), the filtering discrimination section 22 outputs a packet transmission message to the packet holding section 26 and ends the filtering discrimination processing (step B5).

On the other hand, if the acquired packet priority level indicates "always abandon" (0xFF), the filtering discrimination section 22 outputs a packet abandonment message to the packet holding section 26 and ends the filtering discrimination processing (step B6).

<Filtering Discrimination With Bit Rate Control>

The packet filtering discrimination method with bit rate control will be explained below.

FIG. 18 shows changes over time in packet transmission state of video data while taking MPEG as an example. In the first cycle, only packets including I picture data with highest priority are transmitted. From the next cycle, packets including P picture data are gradually added to the packets to be transmitted. Thereafter, when packets including all I and P picture data are added to the packets to be transmitted, and the designated bit rate has been reached, the number of packets to be transmitted ceases to increase. To attain filtering discrimination, the following three different comparison discrimination processing operations are executed.

(1) Comparison between Packet Priority and Discrimination Boundary Level (2) Comparison between Number of Transmitted Data Bytes and Number of Maximum Transmittable Bytes (3) Comparison between Number of Transmission-permitted Frames and Frame Counter Immediately after the beginning of stream transmission, the discrimination boundary level is set at boundary_level=0x00. This means that only packets with a priority value=0x00 are transmitted, and other packets are abandoned. Also, the number of transmission-permitted frames is set at permit_frames=0. The number of transmission-permitted frames indicates the number of frames that are permitted to be transmitted within one cycle.

When stream transmission is started, and the first cycle informing packet is detected, boundary_level=0x01 and permit_frames=1 are set. This means that transmission of packets is only permitted if packets have a priority value=0x00, or if packets have a priority value=0x01 and belong to the first frame.

In this case, packets with a priority value=0x02 or larger are unconditionally abandoned. Upon completion of packet processing for one cycle, if the number of transmittable bytes is not exceeded, permit_frames=2 is set to permit to transmit packets with a priority value=0x01 for two frames.

After several cycles, if the number of transmittable bytes is not exceeded after all the packets with the priority value=0x01 have been transmitted, the number of transmission-permitted frames (permit_frames) is reset, and the discrimination boundary level is incremented by one to set boundary_level=x02.

In the next cycle, packets with priority values=0x00 and 0x01 are unconditionally transmitted, and transmission/abandonment of packets with a priority value=0x02 is determined in consideration of the number of transmission-permitted frames and the result of the number of transmitted bytes. Also, packets with a priority value=0x03 or larger are unconditionally abandoned.

As the number of cycles increases, the number of transmitted packets gradually increases, and soon reaches the number of transmittable bytes per cycle. This means that the boundary level of packet filtering discrimination is determined. In the subsequent cycles, the discrimination boundary level remains the same, and the number of transmitted packets per cycle becomes nearly constant.

Figure 19:
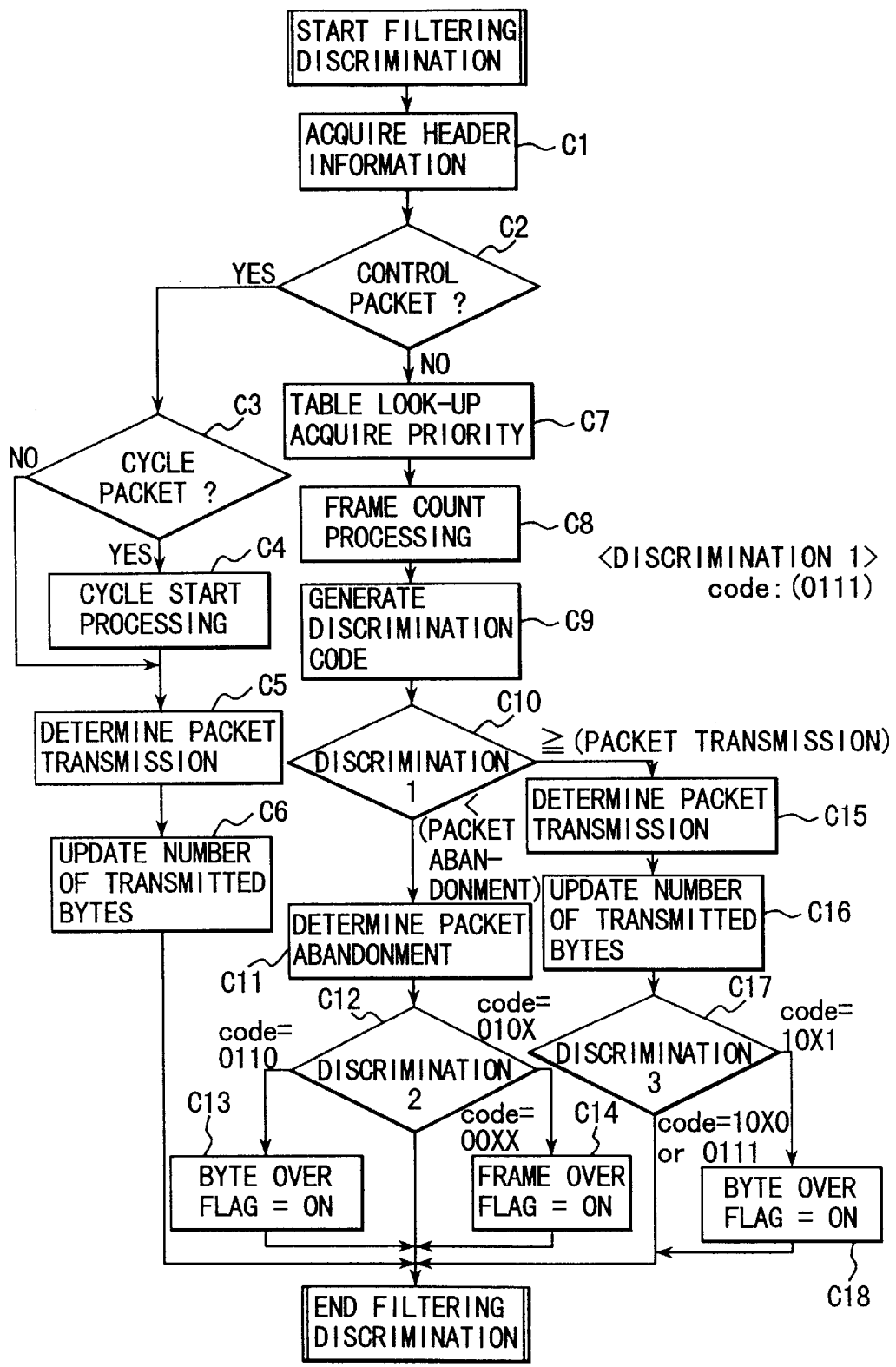
FIG. 19 is a flow chart showing the filtering discrimination processing including bit rate control in the embodiment of the present invention.

FIG. 19 is a flow chart showing the filtering discrimination processing with bit rate control. This processing will be explained below with reference to the flow chart in FIG. 19.

Figure 20:
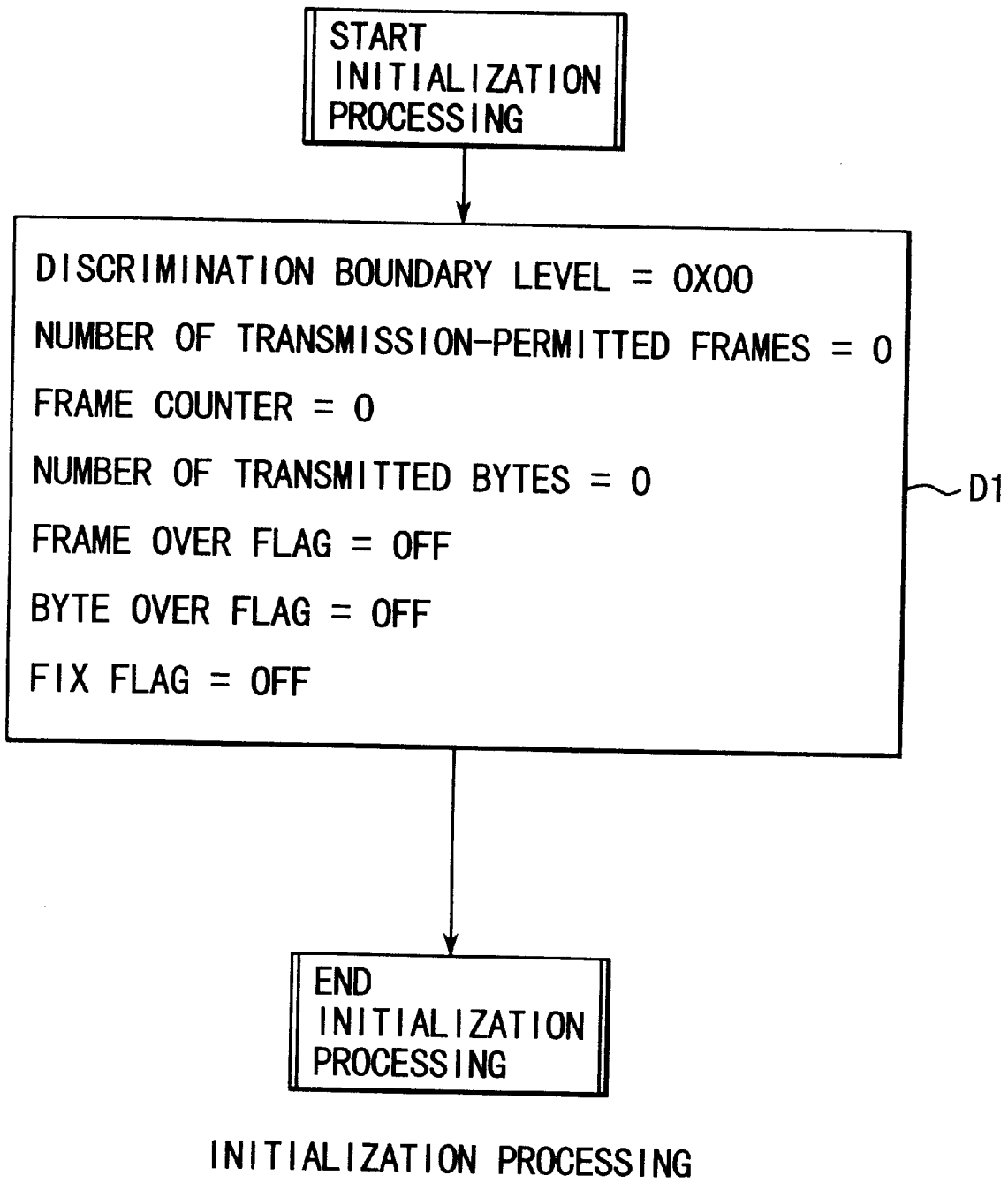
FIG. 20 is a flow chart showing the initialization processing in FIG. 19.

Assume that initialization processing (step D1) shown in the flow chart in FIG. 20 has already been executed prior to the beginning of transmission.

The filtering discrimination section 22 acquires the packet identifier, link information, and packet length in the individual fields from each packet header obtained from the header extraction section 24 (step C1). The filtering discrimination section 22 looks up the most significant bit of the packet identifier to check if the packet of interest is a control packet (step C2).

If the packet of interest is a control packet and a cycle packet (step C3), the filtering discrimination section 22 executes cycle start processing (step C4). In this cycle start processing, the packet abandonment result in the previous cycle is checked to update the discrimination boundary level and the number of transmission-permitted frames, and to reset various cycle variables.

When the control packet is to be transmitted to the receiving system, the filtering discrimination section 22 outputs a packet transmission message to the packet holding section 26 (step C5), updates the number of transmitted bytes (step C6), and then ends filtering discrimination (the control packet may not be transmitted).

On the other hand, if the packet of interest is a data packet (C2), the filtering discrimination section 22 looks up the filtering information table 28 using the header identifier as a key to acquire the packet priority level corresponding to the identifier (step C7).

The filtering discrimination section 22 executes frame count processing (step C8; its processing procedure will be described in detail later (FIG. 23)). In this processing, the number of frames to which packets having the same priority as the discrimination boundary level belong is counted by looking up the identifiers and link fields in the packet headers. This is to accurately count the number of frames even when data belonging to one frame is divided into a plurality of packets.

Subsequently, the filtering discrimination section 22 generates a discrimination code (step C9; this processing procedure will be described in detail later (FIG. 24)). The discrimination code summarizes the results of the three different comparison discrimination processing operations, and is used for determining packet transmission/abandonment.

The filtering discrimination section 22 executes discrimination 1 (for determining whether the packet is to be transmitted/abandoned) on the basis of the discrimination code (step C10), and then executes processing in correspondence with the discrimination result.

If discrimination 1 determines that the packet is to be transmitted, the filtering discrimination section 22 determines packet transmission, and outputs a packet transmission message to the packet holding section 26 (step C15). Also, the section 22 updates the number of transmitted bytes (step C16).

At this time, the filtering discrimination section 22 executes discrimination 3 (step C17) to check if the number of transmitted bytes has exceeded the number of transmittable bytes. If it is determined that the number of transmitted bytes has exceeded the number of transmittable bytes, the section 22 sets the byte over flag=ON (step C18).

With the above-mentioned processing, the filtering processing ends.

On the other hand, if discrimination 1 determines that the packet is to be abandoned (step C10), the filtering discrimination section 22 determines packet abandonment, and outputs a packet abandonment message to the packet holding section 26 (step C11).

At this time, the filtering discrimination section 22 executes discrimination 2 (step C12) to obtain the reason for packet abandonment, and then executes processing corresponding to the obtained reason.

More specifically, when packet abandonment is determined because of low priority, the filtering discrimination processing ends without any processing. On the other hand, when packet abandonment is determined because of an exceeded number of bytes, the byte over flag is turned on (step C13). Also, when packet abandonment is determined because of an exceeded number of frames, the frame over flag is turned on (step C14).

With the above-mentioned processing, the filtering processing ends.

Figure 21:
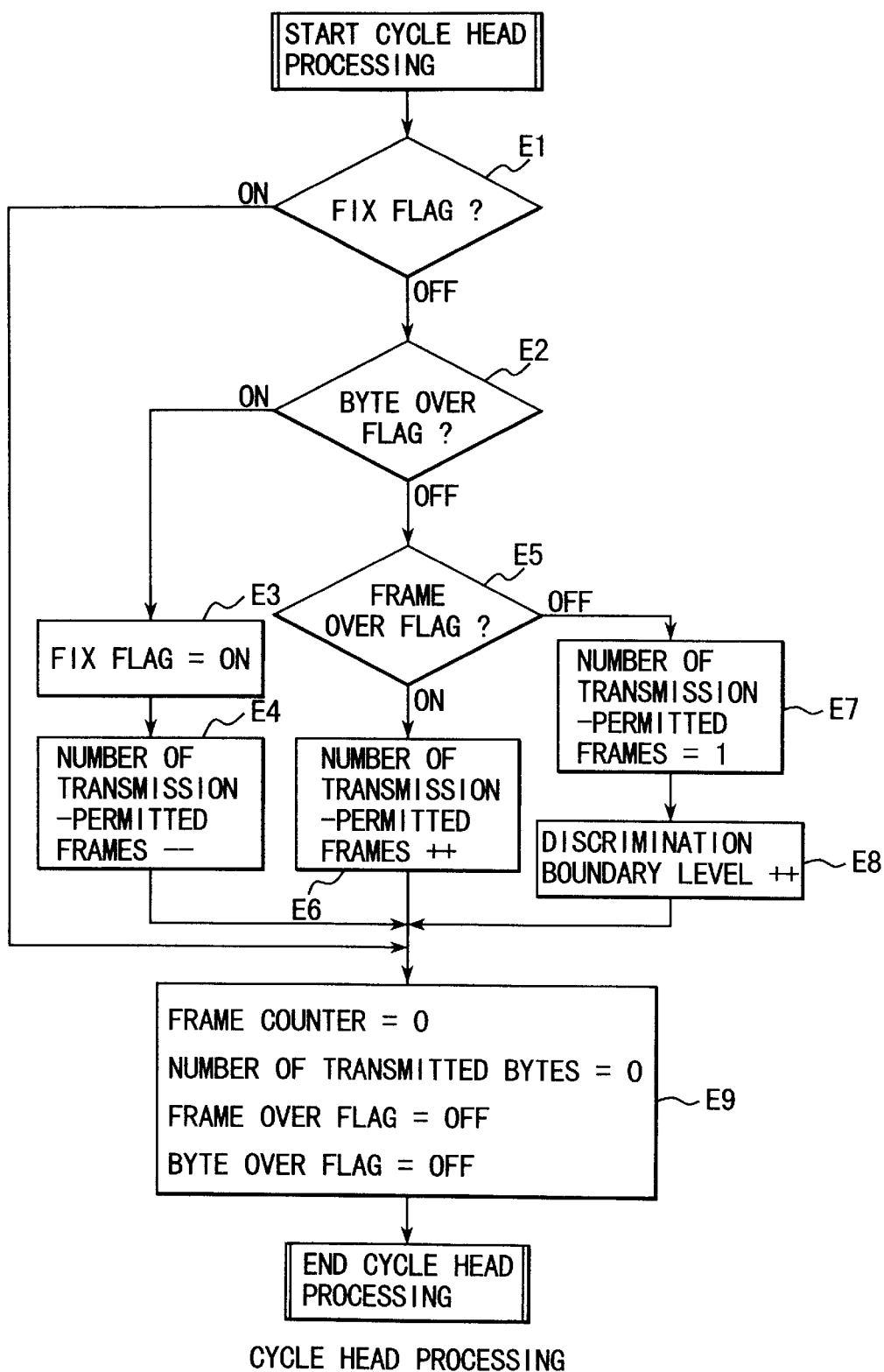
FIG. 21 is a flow chart showing in detail the cycle head processing in FIG. 19.

FIG. 21 is a flow chart showing in detail the cycle head (start) processing (FIG. 19 (step C4)).

The head of the cycle also means the end of the previous cycle. Hence, in the cycle head processing, initialization processing (for resetting various cycle variables) at the head of the cycle is performed (step E9). More specifically, the initialization processing at the head of the cycle resets the frame counter, the number of transmitted bytes, the number of abandoned bytes, the frame over flag, and the byte over flag.

Together with the initialization processing at the head of the cycle, the discrimination boundary level and the number of transmission-permitted frames are updated and the fix flag state is changed as the transmission result confirmation processing of the previous cycle. FIG. 22 summarizes the transmission result confirmation processing of the previous cycle.

More specifically, if the fix flag is OFF (step E1), and if the byte over flag and the frame over flag are respectively OFF and ON (steps E2 and E5), since the number of transmittable bytes has not been reached yet, the filtering discrimination section 22 increments the number of frames to be transmitted per cycle by one. (step E6).

On the other hand, if the fix flag is OFF (step E1), and if the byte over flag is ON (step E2), the filtering discrimination section 22 determines that the boundary level of packet transmission/abandonment is determined, turns on the fix flag (step E3), and decrements the number of transmission-permitted frames by one to fall within the allowable range (step E4).

Furthermore, if the fix flag is OFF (step E1), and if both the frame over flag and the byte over flag are OFF (step E5), since all the packets having the same priority as the discrimination boundary level have been transmitted and the number of transmittable bytes has not been reached yet, the filtering discrimination section 22 sets the number of transmission-permitted frames for the next lower level at 1 (step E7), and increments the discrimination boundary level value by one, i.e., lowers the discrimination boundary level (step E8).

Figure 23:
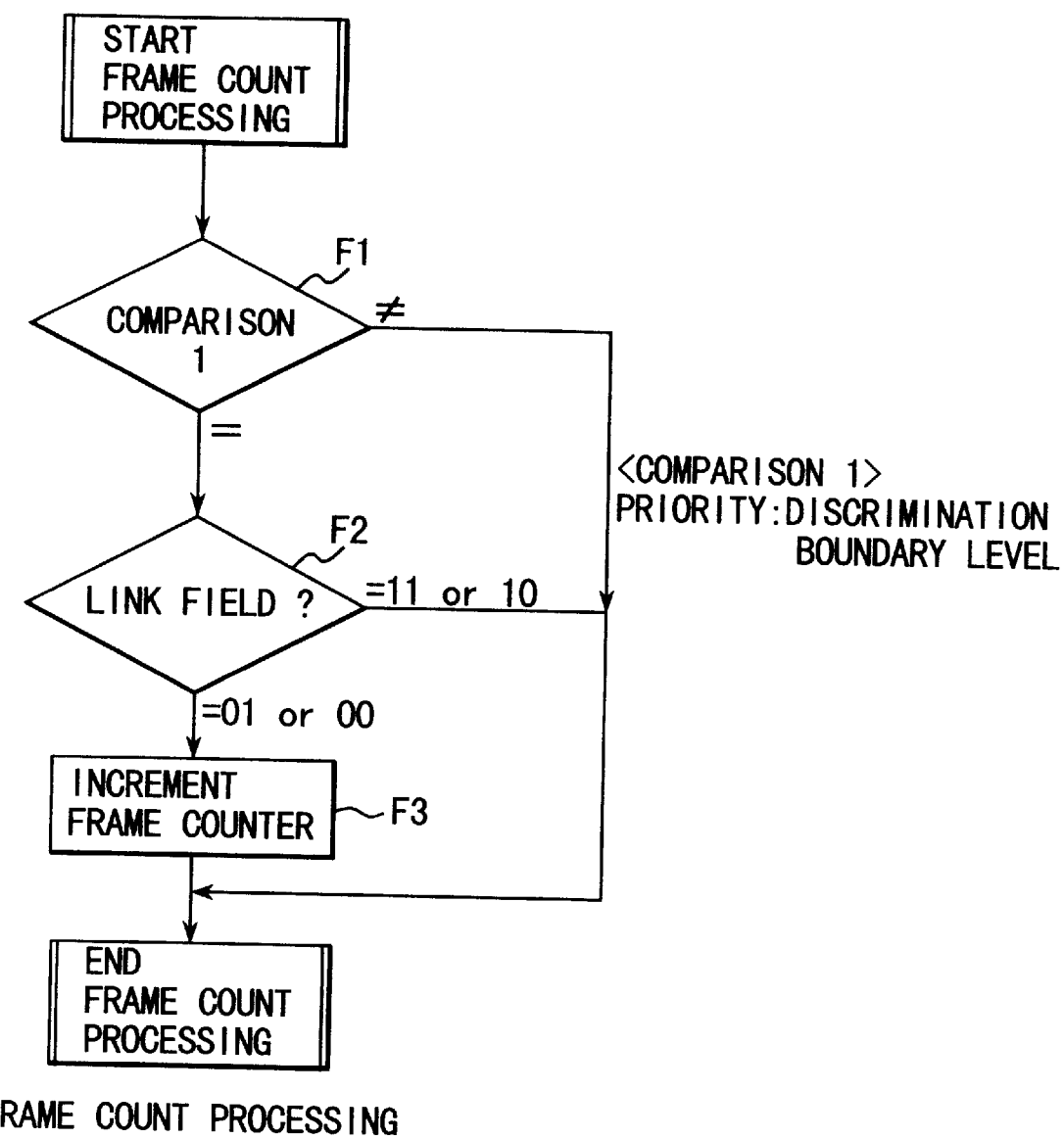
FIG. 23 is a flow chart showing in detail the frame count processing in FIG. 19.

FIG. 23 is a flow chart showing in detail the frame count processing (FIG. 19 (step C8)).

In the frame count processing, the filtering discrimination section 22 compares the priority level and the discrimination boundary level (comparison 1) to check if the packet of interest has the same priority as the discrimination boundary level (step F1). As a result, if the packet of interest has the same priority as the discrimination boundary level, the filtering discrimination section 22 counts the number of frames of the packet. The frame boundary is confirmed based on the link field in the packet header (steps F2 and F3).

Figure 24:
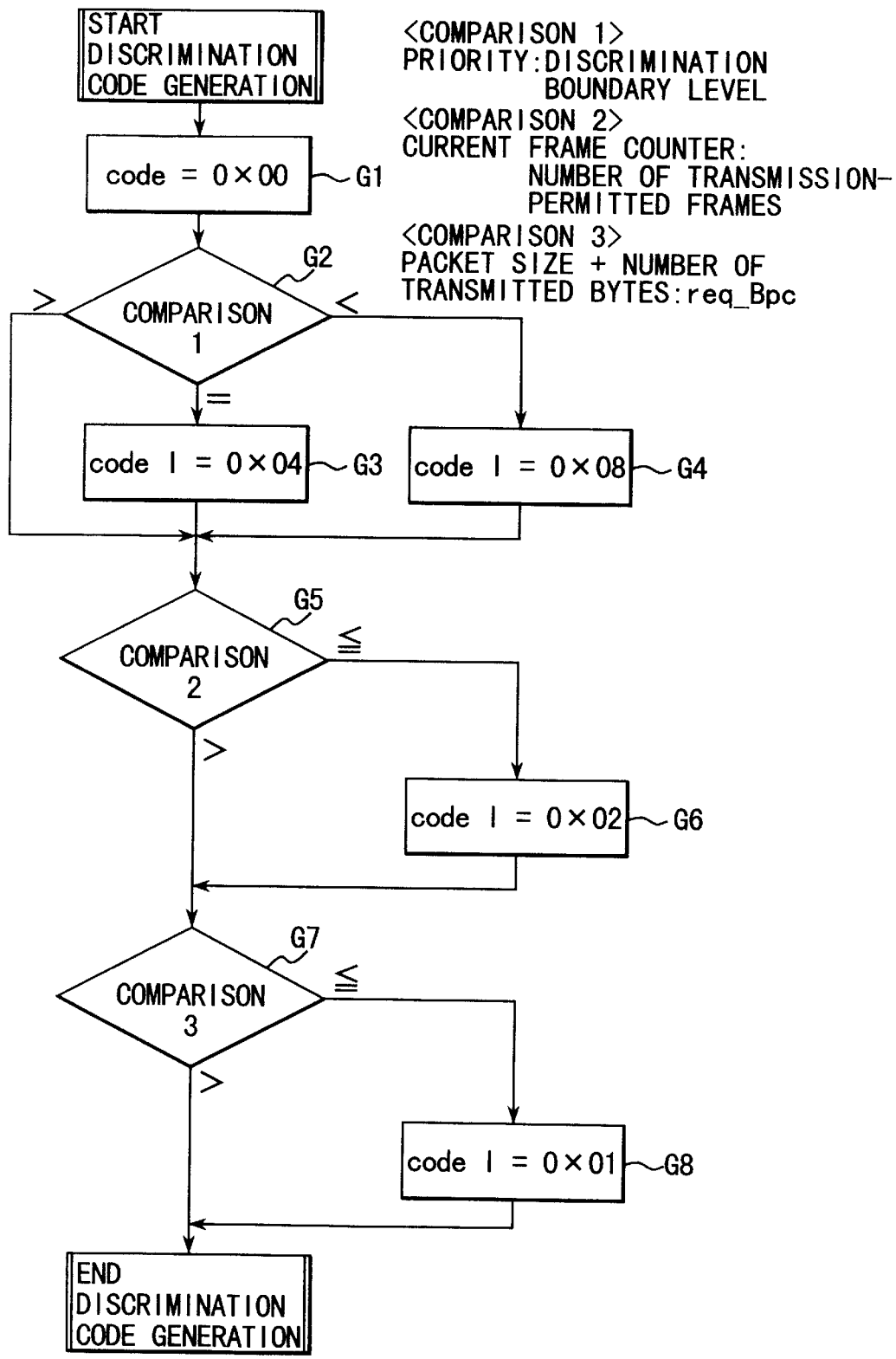
FIG. 24 is a flow chart showing in detail the discrimination code generation processing in FIG. 19.

FIG. 24 is a flow chart showing in detail the discrimination code generation processing (FIG. 19 (step C9)).

The discrimination code (8 bits) summarizes the results of the three comparison arithmetic operations required for determining packet transmission/abandonment.

(a) Comparison Arithmetic Operation 1

"Priority of a packet" and "priority of the discrimination boundary level" are compared (step G2). With this comparison, packets whose transmission/abandonment can be unconditionally determined are selected. The comparison arithmetic operation result is saved in the third and fourth lower bits of the discrimination code (steps G3 and G4).

(b) Comparison Arithmetic Operation 2

"The frame number of a frame to which the packet to be discriminated belongs" and "the number of transmission-permitted frames" are compared (step G5). If the number of transmission-permitted frames has been reached, all packets having the same priority as that of the discrimination boundary level are to be abandoned. The comparison arithmetic operation result is saved in the second lower bit of the discrimination code (step G6).

(c) Comparison Arithmetic Operation 3

"The number of transmitted bytes if the packet to be discriminated is assumed to be transmitted" and "the number of transmittable bytes per cycle" are compared (step G7). If the number of transmittable bytes has been reached, this means that the number of packets to be transmitted per cycle can no longer be increased. The comparison arithmetic operation result is saved in the least significant bit of the discrimination code (step G8).

FIG. 25 shows the code assignment of the comparison arithmetic operation results upon generation of the discrimination code, and FIG. 26 shows the correspondence between the discrimination code (assigned code) and the processing contents of the packet processing.

Effect of Stream Shaping Processing

Figure 27:
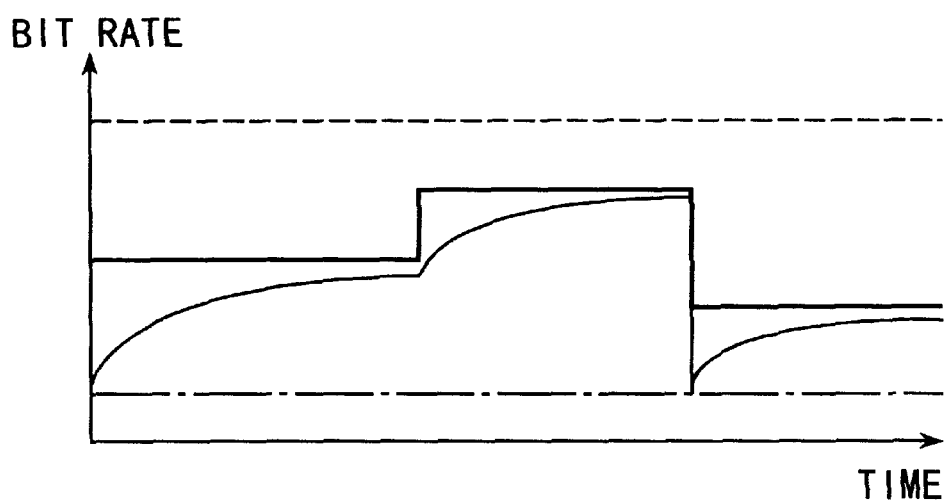
FIG. 27 is a graph showing changes in bit rate as a result of the stream shaping processing of the video transmission system in the embodiment of the present invention.

FIG. 27 shows changes in bit rate as a result of the stream shaping processing of the video transmission system in this embodiment. In FIG. 27, the bold line indicates the stream after the shaping processing, the thin line indicates the designated bit rate, the dotted line indicates the original encoded stream, and the alternate long and short dashed line indicates the stream subjected to the full shaping processing.

Immediately after the beginning of stream transmission, since only packets with high priority are transmitted, the transmitted data volume is lower than the target bit rate (designated bit rate). The number of packets to be transmitted is gradually increased in units of coding cycles in consideration of packet priority, and the bit rate is made to approach the target bit rate (see FIG. 18).

During encoded stream transmission, if the bit rate is changed to a value larger than the target bit rate designated so far, the number of packets to be transmitted is increased again from that in the transmission state so far, thereby making the bit rate approach the new target bit rate.

Conversely, when the target bit rate is lowered, the initial state is restored, and the number of packets to be transmitted is gradually increased from packets with highest priority, thereby making the bit rate approach the target bit rate.

In this manner, an input stream is packetized in units of hierarchical data in the hierarchically encoded stream to obtain an encoded stream in which priority levels are added to the individual packets, and the encoded stream is transmitted while executing bit rate control based on packet filtering in consideration of the available network bandwidth, packet priority, and user's demands. The bit rate control not only can set designated levels prepared in advance, but also can arbitrary set the bit rate of the stream to be transmitted, and can dynamically control the bit rate not to exceed the designated bit rate.

In the above embodiment, the encoded stream to be transmitted is the one in which video data, audio data, user data, and the like are multiplexed, and the bit rate control method of the video data portion has been mainly described. If audio data is hierarchically encoded, the audio data portion can be subjected to the bit rate control. Of course, the bit rate control can be made for other types of data.

As described in detail above, according to the present invention, dynamic bit rate control can be realized according to the designated bit rate independently of the moving image coding scheme used.

The present invention is not limited to the above-described embodiment and can be modified without departing from the spirit and scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A data transmission system comprising:
   input means for inputting an encoded stream of packets in which control packets indicating coding cycles are cyclically inserted;
   transmission means for transmitting the encoded stream input from said input means onto a network; and
   control means for controlling a transmission of the encoded stream by said transmission means by determining a transmission or abandonment for each packet in the encoded stream, wherein said control means determines transmission or abandonment in units of said coding cycles discriminated based on the control packets in the encoded stream.

2. A system according to claim 1, further comprising a designation means for designating a bit rate; and
   wherein said control means determines the transmission or abandonment for each packet not to exceed the bit rate designated by said designation means while increasing the number of packets to be transmitted.

3. A data transmission system, comprising:
   designation means for designating a bit rate;
   stream coding means for generating an encoded stream which is packetized in units of abandonable data, and in which a header including a packet identifier also serving as packet priority is added to each packet;
   insertion means for cyclically inserting control packets indicating coding cycles into the encoded stream;
   stream shaping processing means for determining transmission or abandonment for each of the packets in the encoded stream using the packet identifier included in the header of each packet in accordance with the designated bit rate by the designation means; and
   transmission means for transmitting the encoded stream made up of packets which are determined to be transmitted by said stream shaping processing means onto a network, wherein said stream shaping processing means determines transmission or abandonment for each packet not to exceed the bit rate designated by the designation means while increasing the number of packets to be transmitted in units of cycles discriminated based on the control packets.

4. A system according to claim 3, wherein said designation means comprises means for dynamically changing the bit rate during transmission of the encoded stream by said transmission means.

5. A system according to claim 3, wherein said stream shaping processing means comprises:
   table generation means for generating a filtering information table in which a correspondence between the packet identifier included in the header of each packet of the encoded stream generated by said stream coding means, and packet priority is registered; and
   filtering discrimination means for discriminating transmission or abandonment for each of the packets with reference to the filtering information table generated by said table generation means on the basis of the packet identifier included in the header extracted from each packet in the encoded stream to be transmitted.

6. A system according to claim 5, wherein said table generation means comprises setting means for setting the correspondence between the packet identifier and packet priority by reflecting an externally input designation.

7. A system according to claim 3, wherein said stream shaping processing means comprises:
   holding means for holding discrimination boundary priority to be compared with the priority based on the packet identifier so as to determine transmission or abandonment for each packet;
   number of packets increasing means for gradually increasing the number of packets having the same priority as the discrimination boundary priority in units of cycles discriminated based on the control packets by transmitting packets having priority higher than the discrimination boundary priority and abandoning packets having priority lower than the discrimination boundary priority;
   priority changing means for lowering the discrimination boundary priority after all packets having the same priority as the discrimination boundary priority in one cycle are transmitted; and
   means for stopping increases in the number of packets to be transmitted when the designated bit rate is reached.

8. A system according to claim 3, wherein said stream coding means provides a hierarchical structure to the packet identifier included in the header, and generates the encoded stream which expresses packet priority based on contents of the individual layers of the hierarchical structure.

9. A system according to claim 3, wherein said stream coding means generates the encoded stream which allows to discriminate if the packet identifier included in the header has absolute packet priority whose value cannot be absolutely changed or variable packet priority whose value can be changed.

10. A system according to claim 3, wherein said stream coding means comprises means for generating an encoded stream in which the packet identifier included in the header can be set to indicate whether or not a packet is abandonable.

11. A system according to claim 3, wherein said stream coding means comprises means for setting data indicating a link relationship between previous and next packets in the header.

12. A relay node which is arranged on a network route and is located between a data transmitting system and a data receiving system, comprising:

reception means for receiving an encoded stream which is packetized in units of abandonable data, in which a header including a packet identifier also serving as packet priority is added to each of the packets and control packets indicating coding cycles are cyclically inserted from said transmitting system;

stream shaping processing means for determining transmission or abandonment for each packet in said encoded stream using priority based on the packet identifier included in the header of each of the packets; and transmission means for transmitting the encoded stream made up of the packets which are determined to be transmitted by said stream shaping processing means to the data receiving system via the network, wherein said stream shaping processing means determines transmission or abandonment for each packet not to exceed a designated bit rate while increasing the number of packets to be transmitted in units of cycles discriminated based on the control packets.

13. A data transmission method for transmitting an encoded stream via a network, comprising:

transmitting said encoded stream which is packetized in units of abandonable data and in which a header including a packet identifier is added to each packet, while controlling a bit rate by transmitting or abandoning each of the packets using packet priority determined based on the packet identifier included in the header of each packet in units of packets in accordance with a designated bit rate, wherein control packets indicating coding cycles are cyclically inserted in the encoded stream, and transmission or abandonment for each packet is determined not to exceed the designated bit rate while increasing the number of packets to be transmitted in units of cycles discriminated based on the control packets.

* * * * *